(12) United States Patent
Ahn et al.

(10) Patent No.: US 10,393,923 B2
(45) Date of Patent: Aug. 27, 2019

(54) METHOD OF DETERMINING A MAP OF HEIGHT OF LIQUID HYDROCARBON IN A RESERVOIR

(71) Applicant: TOTAL SA, Courbevoie (FR)

(72) Inventors: Sung-Bin Ahn, Paris (FR); Patrice Schirmer, Colombes (FR); Eric Tawile, Courbevoie (FR)

(73) Assignee: TOTAL SA, Courbevoie (FR)

( * ) Notice: Subject to any disclaimer, the term of this patent is extended or adjusted under 35 U.S.C. 154(b) by 310 days.

(21) Appl. No.: 15/313,017

(22) PCT Filed: May 19, 2015

(86) PCT No.: PCT/FR2015/051309
§ 371 (c)(1),
(2) Date: Nov. 21, 2016

(87) PCT Pub. No.: WO2015/177455
PCT Pub. Date: Nov. 26, 2015

(65) Prior Publication Data
US 2017/0184761 A1 Jun. 29, 2017

(30) Foreign Application Priority Data
May 19, 2014 (FR) .................................. 14 54477

(51) Int. Cl.
*G01V 99/00* (2009.01)

(52) U.S. Cl.
CPC ...... *G01V 99/005* (2013.01); *G01V 2210/665* (2013.01); *G01V 2210/667* (2013.01)

(58) Field of Classification Search
None
See application file for complete search history.

(56) References Cited

U.S. PATENT DOCUMENTS

| | | | |
|---|---|---|---|
| 2006/0052938 A1 | 3/2006 | Thorne et al. | |
| 2011/0231164 A1* | 9/2011 | Zhang | G01V 99/005 703/2 |

(Continued)

FOREIGN PATENT DOCUMENTS

FR    2 926 379 A1    7/2009

OTHER PUBLICATIONS

International Search Report for PCT/FR2015/051309, dated Sep. 15, 2015, 4 pages.

(Continued)

*Primary Examiner* — Gregory J Toatley, Jr.
*Assistant Examiner* — Terence E Stifter, Jr.
(74) *Attorney, Agent, or Firm* — Patterson Thuente Pedersen, P.A.

(57) ABSTRACT

This invention relates to a method for determining a map of expectation and/or of variance of height of liquid hydrocarbon in a geological model. The method allows analytical resolution of these maps while taking account of the uncertainties in the variables allowing this calculation such as the porosity or oil saturation of the rock and also the uncertainty in the presence of certain types of facies given by the apportionment cubes of architectural elements $p_{AE}(c)$ and proportion cubes for each facies, these proportions then having a triangular distribution defined by the following three values $p_{A,AE,min}(c)$, $p_{A,AE,max}(c)$ and $p_{A,AE,mode}(c)$. In particular, the method comprises the calculation of the sum of the plurality of architectural elements of $p_{AE}(c) \cdot \frac{1}{3} (p_{A,AE,min}(c)+p_{A,AE,max}(c)+p_{A,AE,mode}(c))$ and the determining of a value of expectation of height of liquid hydrocarbon for said column as a function of the sum determined.

10 Claims, 6 Drawing Sheets

(56) References Cited

U.S. PATENT DOCUMENTS

2014/0019108 A1* 1/2014 Da Veiga ............ E21B 41/0092
703/10
2015/0316684 A1* 11/2015 Schirmer ............. G01V 99/005
703/2

OTHER PUBLICATIONS

English translation of International Search Report for PCT/FR2015/051309, dated Sep. 15, 2015, 5 pages.
Written Opinion for PCT/FR2015/051309, dated Sep. 15, 2015, 4 pages.
English translation of Written Opinion for PCT/FR2015/051309, dated Sep. 15, 2015, 5 pages.
T. Charles et al: "Experience with the Quantification of Subsurface Uncertainties", SPE Asia Pacific Oil and Gas Conference and Exhibition, April 17-19, 2001. Jakarta, Indonesia, Dec. 1, 2001 (Dec. 1, 2001), pp. 1-10, XP055071048, DOI: 10.2118/68703-MS ISBN: 978-1-55-563920-4.
Amisha Maharaja: "Global net-to-gross uncertainty assessment at reservoir appraisal stage", Jun. 1, 2007 (Jun. 1, 2007), XP055161516, Retrieved from the Internet: URL:http://ddod.riss.kr/ddodservice/search/viewDetailThesisInfoForm.jsp?p_no=11420482&p_abstract_yn=Y&p_toc_yn=N&p_fulltext_kind=002&p_search=&p_k2dockey [retrieved on Jan. 12, 2015].

* cited by examiner

Esp (HUPHISO)

Var (HUPHISO)

METHOD OF DETERMINING A MAP OF HEIGHT OF LIQUID HYDROCARBON IN A RESERVOIR

RELATED APPLICATIONS

The present application is a National Phase entry of PCT Application No. PCT/FR2015/051309 filed May 19, 2015, which claims priority from FR Patent Application No. 14 54477, filed May 19, 2014, said applications being hereby incorporated by reference herein in their entirety.

FIELD OF THE INVENTION

This invention relates to the field of determining liquid hydrocarbon reserves in a reservoir and, in particular, the field of maps of height of liquid hydrocarbon in a reservoir.

BACKGROUND OF THE INVENTION

In order to easily determine the hydrocarbon reserves (gas, petrol or oils) of reservoirs in operation or reservoirs to be operated, geologists most often manipulate and study two-dimensional maps that represent the "HuPhiSo" (referred to as "HuPhiSo" maps). Indeed, these maps are summarised and quickly provide the geologist with information as to the economic value of the reservoir (3D).

For a three-dimensional rock volume, the "HuPhiSo" map (in two dimensions) comprises a plurality of values, with each value being the product of several parameters:

$$HuPhiSo = h \cdot NTG \cdot \varphi \cdot So$$

with the parameter h being the height of the column (according to the axis $\vec{z}$ if the map is according to the plane $(\vec{x}, \vec{y})$), the parameter NTG ("Net to Gross") being the fraction of the rock volume favourable to the presence of hydrocarbons, with the parameter $\varphi$ being the porosity of the rock and the parameter So being the oil saturation of the porosities.

As such, if V is the rock volume considered, V·NTG·Phi So is the volume of oil contained in the rock volume. A value "HuPhiSo" represents the "height of the column of oil" in a column under consideration. However, this value is indirectly connected to the volume of the oil and can represent the "surface density of the oil".

For a model meshed with parallelepiped cells, it is possible to calculate a "HuPhiSo" value for the final map by summing the value "HuPhiSo" of each cell of a column of this model.

Of course, the determining of the "HuPhiSo" values can be simple if the parameters h, NTG, Phi and So are known for certain for any point/cell of the model. However, in practice, these parameters are perfectly known only in a few isolated points: the points of the drilling wells. Of course, it is possible to simulate these parameters for the other cells thanks to the crossing of various data analyses (ex. seismic) and the use of stochastic simulation algorithms based on geostatistical methods in order to "supplement" the model. To this is added the natural distribution of the petrol-physical properties (acoustic impedance, effective porosity, porosity of the rocks in the NTG, etc.). Each physical magnitude can therefore be considered as a random variable, possibly non-stationary (ex. the porosity decreases most often with the depth).

There are a large number of uncertainties that weigh on the various parameters on which the HuPhiSo map depends, in such a way that the latter can vary substantially from one possible map to another.

For making decisions, reservoir engineers particularly appreciate the maps of expectation of the HuPhiSo and maps of expectation (or of variance) around the expectation of the HuPhiSo.

Usually, these maps are obtained by simulating a large number of HuPhiSo maps. For each cell of the map, an average and a variance are then calculated according to the corresponding cells in the simulated HuPhiSo maps.

However, each simulation can be costly in terms of resources and in calculation time and it is not rare for the determining of maps of expectation and standard deviation to take several hundred hours.

There is therefore a need for determining an average HuPhiSo map (expectation) and/or of the interval of uncertainties corresponding to this map (variance or standard deviation) more quickly, without carrying out a large number of simulations of HuPhiSo maps.

SUMMARY OF THE INVENTION

To this effect, this invention proposes an analytical method that makes it possible, after certain simplifications, to directly determine the expectation of the height of liquid hydrocarbon in a geological model.

This invention then aims for a method of determining a map of expectation of height of liquid hydrocarbon in a geological model, with the geological model comprising meshes able to be associated with a facies among a plurality of facies and with an architectural element among a plurality of architectural elements.

The method comprises, for at least one column of the geological model:

/a/ receiving an apportionment cube for each architectural element AE among the plurality of architectural elements, with the apportionment cube describing for each mesh c of the model the probability $p_{AE}(c)$ that said mesh belongs to said architectural element, /b/ receiving a proportion cube for each facies among the plurality of facies and for each architectural element among the plurality of architectural elements, with the proportion cube associated with a facies A and with an architectural element AE describing for each mesh c of the model the proportion of said facies in said mesh if said mesh belongs to said architectural element AE, with said proportion being a random variable of triangular distribution defined by a minimum value $p_{A,AE,min}(c)$, a maximum value $p_{A,AE,max}(c)$, and a mode $p_{A,AE,mode}(c)$, /c/ determining, for each mesh c of said column and for each facies A of the plurality of facies, the sum over the plurality of architectural elements of $p_{AE}(c) \cdot \frac{1}{3}(p_{A,AE,min}(c) + p_{A,AE,max}c + p_{A,AE,mode}c$.

/d/ determining of the value of expectation of height of liquid hydrocarbon for said column analytically as a function of the sum determined in the step /c/ for each mesh c of said column and for each facies A.

Normally, the expectation of the value HuPhiSo is very difficult to calculate directly $Esp(HuPhiSo) = Esp(h \cdot NTG \cdot \varphi \cdot So)$ because all of the variables NTG, Phi So depend in particular on the facies and as such on the location of the facies in the model.

The mode of a triangular distribution can also be called base.

In this invention, Esp(X) designates the expectation (average value) of a random variable X, Var(X) designates its variance and Cov(X,Y) designates the covariance of two random variables X, Y.

By making the hypothesis of the independence of the parameters NTG, Phi and So, it is possible to greatly simplify the calculation of this expectation. Experimentally this hypothesis was verified and this simplification, which is not the simple application of mathematical principles, makes it possible to mutualise the calculation of the sum (over the plurality of architectural elements) of $p_{AE}(c) \cdot \frac{1}{3} (p_{A,AE,min}(c) + p_{A,AE,max}(c) + p_{A,AE,mode}(c))$ and possible to separately calculate the expectations of $Esp(\varphi_A(c))$, $Esp(NTG_A(c))$, $Esp(So_A(c))$.

This simplification allows for better effectiveness during the calculations to be made of the expectation and as such to substantially improve the required calculation time.

Furthermore, with each mesh c of the model able to be associated with a proportion of porosity for each one of the facies of said plurality of facies, with said proportion of porosity able to be a random variable of triangular distribution defined by a minimum value $\varphi_{A,min}(c)$, a maximum value $\varphi_{A,max}(c)$, and a mode $\varphi_{A,mode}(c)$, the method can further comprise:

/c-1/ determining, for each mesh c of said column and for each facies A among the plurality of facies, the value $\frac{1}{3}(\varphi_{A,min}(c) + \varphi_{A,max}(c) + \varphi_{A,mode}(c))$, The determination of the step /d/ can then be according to the value determined in the step /c-1/ for each mesh c of said column and for each facies A among the plurality of facies.

As such, the value $Esp(\varphi_A(c))$ can then be calculated easily, independently of the other parameters, if the variable $\varphi_A(c)$ comprises an uncertainty.

In a possible embodiment, with each mesh c of the model able to be associated with a proportion of rock volume favourable to the presence of hydrocarbons for each one of the facies of said plurality of facies, with said proportion of rock volume favourable to the presence of hydrocarbons able to be a random variable of triangular distribution defined by a minimum value $NTG_{A,min}(c)$, a maximum value $NTG_{A,max}(c)$, and a mode $NTG_{A,mode}(c)$, the method can further comprise:

/c-2/ determining, for each mesh c of said column and for each facies A among the plurality of facies, the value $\frac{1}{3}(NTG_{A,min}(c) + NTG_{A,max}(c) + NTG_{A,mode}(c))$, The determination of the step /d/ can then be according to the value determined in the step /c-2/ for each mesh c of said column and for each facies A among the plurality of facies.

As such, the value $Esp(NTG_A(c))$ can be calculated easily, independently of the other parameters, if the variable $NTG_A(c)$ comprises an uncertainty.

Advantageously, with each mesh c of the model able to be associated with a liquid hydrocarbon saturation, with said liquid hydrocarbon saturation able to be characterised by a liquid hydrocarbon-water interface dimension $z_w$ that has a probability $p(z_w)$ of distribution between a maximum value $z_{w,min}$, and a minimum value $z_{w,max}$, and by a triangular distribution of the hydrocarbon saturation for each dimension h above this interface dimensions, with said distribution of hydrocarbon saturation able to be defined by a minimum value $CS_{HC,A,min}(h)$, a maximum value $CS_{HC,A,max}(h)$, and a mode $CS_{HC,A,mode}(h)$ the method can further comprise:

/c-3/ determining, for each mesh c of said column having a dimension z and for each facies A among the plurality of facies, the value $$\int_{z_{w,max}}^{z_{w,min}} \frac{cs_{HC,max}(z - z_w) + cs_{HC,mode}(z - z_w) + cs_{HC,min}(z - z_w)}{3} p(z_w) \cdot dz_w$$

The determination of the step /d/ can be a function of the value determined in the step /c-3/ for each mesh c of said column and for each facies A among the plurality of facies.

By notation, it is chosen that the notation $z_{w,min}$ corresponds to the highest dimension (with an axis $\vec{z}$ upwards) in comparison with the dimension $z_{w,max}$. As such, we have $z_{w,min} \geq z_{w,max}$ by taking this notation. Indeed, the dimension of the interface $z_{w,min}$ (respectively $z_{w,max}$) corresponds to the dimension for which the quantity of hydrocarbon is the least substantial (respectively the most substantial).

All of the notations of dimension $z_{X,min}$, and $z_{X,max}$ respect the same principle (with X able to be any character string).

In a particular embodiment of the invention, with said liquid hydrocarbon saturation able to be characterised by a dimension of the liquid hydrocarbon-gas interface $z_g$ having a probability $p(z_g)$, of distribution between a minimum value $z_{g,min}$, and a maximum value $z_{g,max}$, the method can further comprise:

/c-4/ determining, for each mesh c of said column having a dimension z, the value $$\begin{cases} 0 & \text{if } z \geq z_{g,min} \\ 1 - \int_{z_{g,max}}^{z} p(z)_g dz_g & \text{if } z_{g,max} \leq z \leq z_{g,min} \\ 1 & \text{if } z \leq z_{g,max} \end{cases}$$

The determination of the step /d/ can be a function of the value determined in the step /c-3/ for each mesh c of dimension z of said column and for each facies A among the plurality of facies, multiplied by the value determined in the step /c-4/ for each mesh c of dimension z of said column.

Furthermore, this invention can also relate to a method for determining a map of variance of height of liquid hydrocarbon in a geological model.

The method can comprise, for at least one column of the geological model:

/e/ determining of a value of expectation of height of liquid hydrocarbon for said column, as disclosed hereinabove;

/f/ determining of a value of variance of height of liquid hydrocarbon for said column analytically according to the sum determined in the step /e/.

In an embodiment, the values of the proportion cubes for two different cells of the model and for different architectural elements can be considered independently between them.

Furthermore, the method can further comprise:

/g/ receiving a correlogram $\rho(A, \Delta z)$ according to a direction of said column for said facies A in a given architectural element;

/h/ determining the expectation of the product of the presence of the facies A in said architectural element in a mesh c1 by the presence of the facies A in said architectural element in a mesh c2, with the distance between c1 and c2 according to said direction of the correlogram being $\Delta z$, with the probability of the presence of the facies A of said architectural element for the mesh c1 being $p_{A,AE,c1}$, with the probability of the presence of the facies A of said architectural element for the mesh c2 being $p_{A,AE,c2}$, according to:

$$(1 - \rho(A, \Delta z)) \cdot$$
$$\left( Esp(p_{A,AE,c1}) \cdot (Esp(p_{A,AE,c2}) + \sqrt{\text{Var}(p_{A,AE,c1}) \cdot \text{Var}(p_{A,AE,c2})} \right) +$$
$$\rho(A, \Delta z) \cdot \left( \frac{1}{2} Esp(p_{A,AE,c1}) + \frac{1}{2} Esp(p_{A,AE,c2}) \right)$$

The determination of the step /f/ can then be according to the determination of the step /h/.

This invention also relates to a device intended for determining a map of expectation of height of liquid hydrocarbon in a geological model, with the geological model comprising meshes able to be associated with a facies among a plurality of facies and with an architectural element among a plurality of architectural elements.

The device comprises, for at least one column of the geological model:

/a/ an interface for receiving an apportionment cube of architectural element for each architectural element AE among the plurality of architectural elements, with the apportionment cube describing for each mesh c of the model the probability $p_{AE}(c)$ that said mesh belongs to said architectural element, /b/ an interface for the receiving of a proportion cube for each facies among the plurality of facies and for each architectural element among the plurality of architectural elements, with the proportion cube associated with a facies A and with an architectural element AE describing for each mesh c of the model the proportion of said facies in said mesh if said mesh belongs to said architectural element AE, with said proportion being a random variable of triangular distribution defined by a minimum value $p_{A,AE,min}(c)$, a maximum value $p_{A,AE,max}(c)$, and a mode $p_{A,AE,mode}(c)$, /c/ a circuit for the determining, for each mesh c of said column and for each facies A of the plurality of facies, the sum over the plurality of architectural elements of $p_{AE}(c) \cdot \frac{1}{3}(p_{A,AE,min}(c) + p_{A,AE,max}(c) + p_{A,AE,mode}(c))$, /d/ a circuit for the determining of a value of expectation of height of liquid hydrocarbon for said column analytically according to the sum determined by the circuit /c/ for each mesh c of said column and for each facies A.

As such, this invention also aims for a computer program comprising instructions for the implementing of the method described hereinabove, when this program is executed by a processor.

This program can use any programming language (for example, an object language or other), and be in the form of interpretable source code, a partially compiled code or an entirely compiled code. FIG. 3 described in detail hereinafter, can form the flow chart of the general algorithm of such a computer program.

BRIEF DESCRIPTION OF THE DRAWINGS

Other characteristics and advantages of the invention shall further appear when reading the following description. The latter is solely for the purposes of illustration and must be read with respect to the annexed drawings wherein.

DETAILED DESCRIPTION OF THE DRAWINGS

Figure 1A:
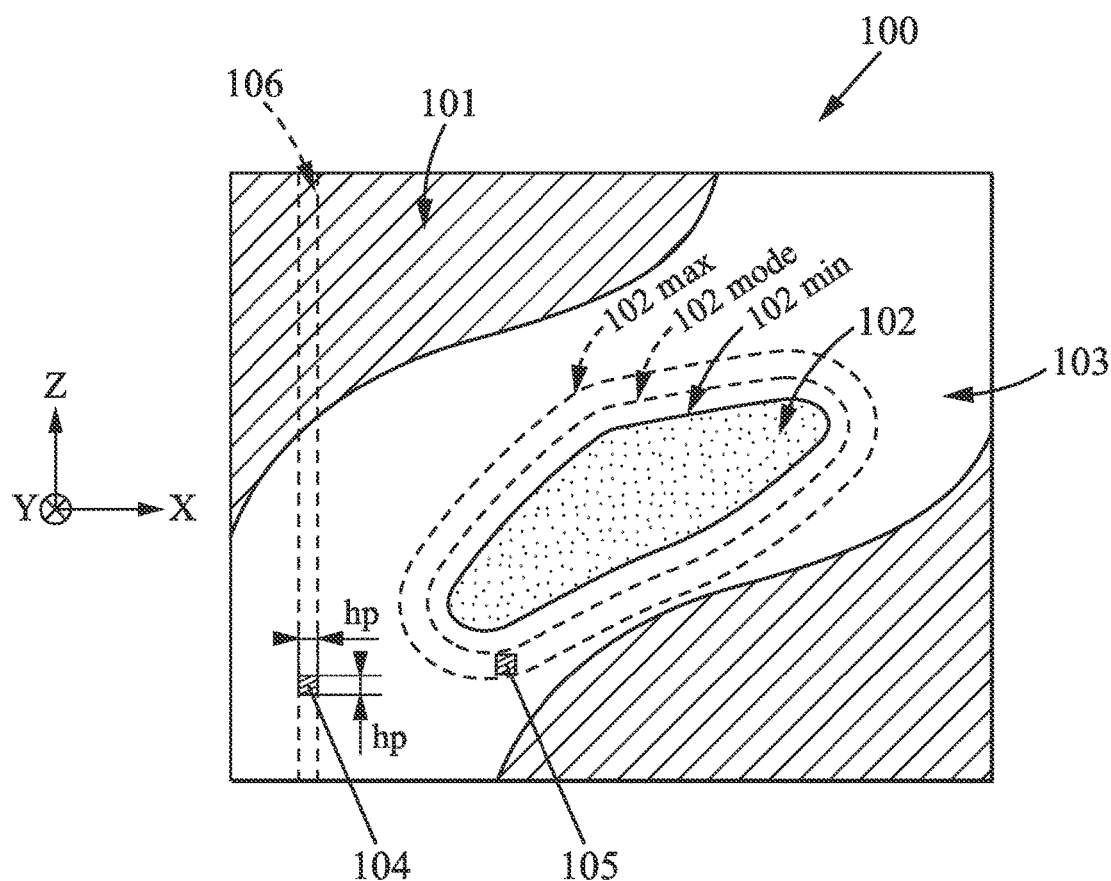
FIG. 1a shows a possible example of a geological model.

FIG. 1a shows a possible example of a transversal cross-section of a geological model 100.

This geological model 100 is comprised of a large number of pixels (ex. 104, 105) each one describing a facies present in the geological subsurface.

The petrol-physical data NTG, Phi and So are often determined for each facies. For each pixel c (of dimensions $h_p \times h_p \times h_p$), it is possible to calculate a "pixel" value of HuPhiSo defined as follows:

$$\sum_{A_i} 1_{A_i}(x, y, z) \cdot h_p \cdot \varphi_{c,A_i} \cdot NTG_{c,A_i} \cdot SO_{c,A_i}$$

where $1_{A_i}(x,y,z)$ is the signalling function of the facies $A_i$ (equal to 1 if the facies for the pixel of coordinates (x,y,z) is $A_i$, equal to 0 otherwise).

Of course, each pixel is associated with a single facies and:

$$\sum_{A_i} 1_{A_i}(x, y, z) = 1$$

Moreover, according to the geological history of the subsurface, the sedimentary filling and the geodynamic context that gave rise to the rocks of the reservoir, the sedimentation can be done heterogeneously but in a structured manner. The sedimentary environments created as such are more or less rich with certain facies.

For example, in a channel, the facies that are most present will be the coarse sands. The farther the rock is from the channel the more clayey it is.

These structures are generally called the architectural elements (AE).

For a given pixel of the model, it is considered that there is only one architectural element. The geological model 100 comprises three architectural elements 101, 102, and 103.

The interfaces between two architectural elements are often marked on maps by geophysicists. For example, the interface $102_{min}$ can represent a possible interface between the architectural element 102 and the architectural element 103.

It is as such possible to introduce, as for the facies, a signalling of architectural elements $1_{AE_j}(x,y,z)$ indicating the presence or not of the architectural element $AE_j$ for the pixel of coordinates (x,y,z).

The proportions of facies in a given pixel c are, most often, a function of the architectural element associated with this pixel c. As such the signalling of facies $A_i$, for a given architectural element $AE_j$, is expressed in the form $1_{A_i|AE_j}$ (x,y,z) (also noted as $1_{A_i,AE_j}(x,y,z)$ or $1_{A_i,AE_j}(c)$).

As such, the "pixel" HuPhiSo value is defined as follows:

$$\sum_{A_i} \sum_{AE_j} 1_{AE_j}(x, y, z) \cdot 1_{A_i|AE_j}(x, y, z) \cdot h_c \cdot \varphi_{c,A_i} \cdot NTG_{c,A_i} \cdot SO_{c,A_i}$$

with $h_c$ the height of the pixel c under consideration.

It is also possible to determine the "column" HuPhiSo values by adding the "pixel" HuPhiSo values for all of the columns of the model (for example, column 106). This "column" HuPhiSo value is given by the following formula:

$$\sum_c \sum_{A_i} \left( \sum_{AE_j} 1_{AE_j}(c) \cdot 1_{A_i|AE_j}(c) \right) \cdot h_c \cdot \varphi_{c,A_i} \cdot NTG_{c,A_i} \cdot So_{c,A_i}$$

with c the pixels of the column under consideration and with $h_c$ the height of the current pixel.

In the general case, the signalling $1_{A_i|AE_j}(x,y,z)$ is not known in a precise manner, pixel by pixel: only the proportion cubes of the various facies $A_i$ are known. In order to overcome this problem, prior solutions proposed:

to determine the limits of the architectural elements stochastically;

to determine a map of facies by stochastically simulating a possible value of facies for each pixel thanks to the given proportion cubes for each facies of each architectural element, to determine "pixel" HuPhiSo value of each pixel;

to determine "pixel HuPhiSo values for each column of the model (i.e. HuPhiSo map);

to reiterate the first four steps a large number of times so as to obtain an average and a converging variance of the HuPhiSo maps.

This invention does not choose this stochastic path.

Indeed, it is possible to determine for each column of the model, the average of the column HuPhiSo values and the variance of the column HuPhiSo values analytically, after certain hypotheses and geological simplifications presented hereinafter.

Determination of the Expectation

The expectation of the column HuPhiSo values can be expressed in the form:

$$Esp(HuPhiSO) = \sum_{c=1}^{n} \sum_{A_i} h_c \cdot \left( \sum_{AE_j} \left( Esp[1_{AE_j}(c)] \cdot Esp[1_{A_i|AE_j}(c)] \right) \right) \cdot$$

$$(Esp(\varphi_{c,A_i}) \cdot Esp(NTG_{c,A_i}) \cdot Esp(SO_{c,A_i}))$$

by assuming that the pixels c of the column are indexed from 1 to n (with n being a positive integer greater than 2).

The expression of this average creates certain geological hypotheses in order to simplify the expression of this average: e.g. the independence of the parameters $\varphi_{c,A_i}$, $NTG_{c,A_i}$ and $SO_{c,A_i}$ (as such, the expectation of the product of these variables is also the products of their expectation). As such, this expression is not the simple mathematical resolution of the problem posited.

If the signalling of facies $1_{A_i}(c)$ is a random variable following a Bernouilli distribution of which the parameter is the local proportion of the facies, then the expectation of this variable knowing $p_{A_i}(c)$ can be expressed in the following form:

$$Esp(1_{A_i}(c)|p_{A_i}(c)) = Esp(1_{A_i}(c)=1|p_{A_i}(c)) = p_{A_i}(c)$$

In conclusion:

$$Esp(1_{A_i}(c)) = Esp(p_{A_i}(c))$$

Figure 1B:
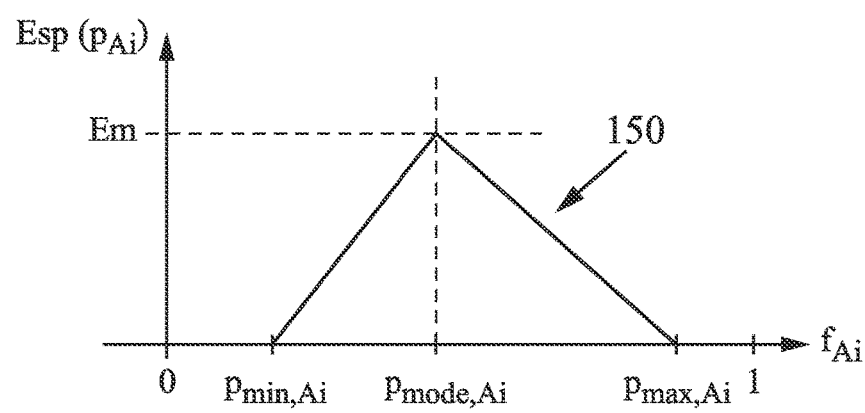
FIG. 1b describes a possible example of a probability distribution that has a triangular distribution.

The proportions $p_{A_i}(c)$ are determined with certainty only on wells. There is therefore an uncertainty on the proportion of facies in the rest of the reservoir. Because of this uncertainty, the proportion of facies can be, it too, a random variable, of which the probability distribution can be modelled by a triangular distribution 150 described in FIG. 1*b* (for a given facies $A_i$ and for a pixel c) having $p_{min,Ai}$ as a minimum value, $p_{mode,Ai}$ as a mode value and $p_{max,Ai}$ as a maximum value. As such:

$$Esp(1_{A_i|AE_j}(c)) = \frac{p_{min,A_i|AE_j}(c) + p_{mode,A_i|AE_j}(c) + p_{max,A_i|AE_j}(c)}{3}$$

Of course, the reservoir is not necessarily stationary, i.e. its proportions $p_{A_i}(c)$ (and $p_{min,A_i}(c)$, $p_{mode,A_i}(c)$, $p_{max,A_i}(c)$) can vary according to the cell c under consideration: for example, by approaching a limit or a particular point, a facies can tend to disappear or tend to predominate.

The same reasoning is valid for calculating the expectation of the signalling of architectural elements. However, the proportion of architectural elements does not have any uncertainty even if several positions of interfaces between architectural elements are possible (the operator is often requested to point a minimum interface $102_{min}$, and a maximum interface $102_{max}$ (possibly a probable interface $102_{mode}$, if this latter interface is not determined, it is considered that this "probable interface" is located at an equal distance from the minimum and maximum interfaces). As such:

$$Esp(1_{AE_j}(c)) = p_{AE_j}(c)$$

In conclusion, and through analogy, the expression $\Sigma_{AE_j} Esp[1_{AE_j}(c)] \cdot Esp1Ai|AEjc$ can be expressed in the form $$\Sigma_{AE_j} p_{AE_j}(c) \cdot \frac{p_{min,A_i|AE_j}(c) + p_{mode,A_i|AE_j}(c) + p_{max,A_i|AE_j}(c)}{3}$$

which is in fact the proportion of facies $A_i$ for the pixel c (which takes into account the possible presence of several AE and therefore several proportion cubes for the same facies).

A rock is comprised of grains and of voids between the grains. The porosity of the rock is the ratio between the volume of the voids and the volume of the rock:

$$\varphi = \frac{V_{void}}{V_{total}}$$

This porosity is most often apportioned according to a natural distribution such as a normal distribution. Its average is, it too, uncertain and follows a triangular probability distribution.

Phi is therefore geologically the sum of two random variables:

$$\varphi = \varphi_{avg} + \varphi_{stoch}$$

where $\varphi_{avg}$ is a random variable that can follow a triangular distribution (similar to FIG. 1b), of minimum value $\varphi_{min}$, of mode value $\varphi_{mode}$ and of maximum value $\varphi_{max}$, and where $\varphi_{stoch}$ is a random variable which follows a centred normal distribution (with zero average).

As such:

$$Esp(\varphi) = Esp(\varphi_{avg}) + Esp(\varphi_{stoch}) = Esp(\varphi_{avg}) = \frac{\varphi_{min} + \varphi_{mode} + \varphi_{max}}{3}$$

The variable NTG represents the fraction of a rock volume favourable to the presence of hydrocarbons. If V is a rock volume, then NTG*V is the volume favourable to the presence of hydrocarbons, it is the useful volume of the rock. The value NTG can be apportioned according to a natural distribution that generally follows (but not necessarily) a normal distribution of average $NTG_{avg}$.

The average $NTG_{avg}$ can be, itself, uncertain and can follow a triangular probability distribution (similar to FIG. 1b), of minimum value $NTG_{min}$, of mode value NTG mode and of maximum value $NTG_{max}$.

The distribution NTG is therefore geologically the sum of two random variables:

$$NTG = NTG_{avg} + NTG_{stoch}$$

where $NTG_{avg}$ is a random variable which follows the triangular distribution described hereinabove and where $NTG_{stoch}$ is a random variable which follows a centred normal distribution (with zero average).

$$Esp(NTG) = Esp(NTG_{avg}) = \frac{NTG_{min} + NTG_{mode} + NTG_{max}}{3}$$

The variable SO represents the oil saturation of the rock. The pores of the rocks can be filled with gas, water or oil (petrol). The oil saturation So, the water saturation Sw and the gas saturation Sg are therefore complementary:

$$So + Sw + Sg = 1$$

In addition, the hydrocarbon saturation (i.e. gas and oil) is noted as $S_{HC}$:

$$S_{HC} = So + S_g$$

There is therefore:

$$S_{HC} = 1 - Sw$$

Figure 2A:
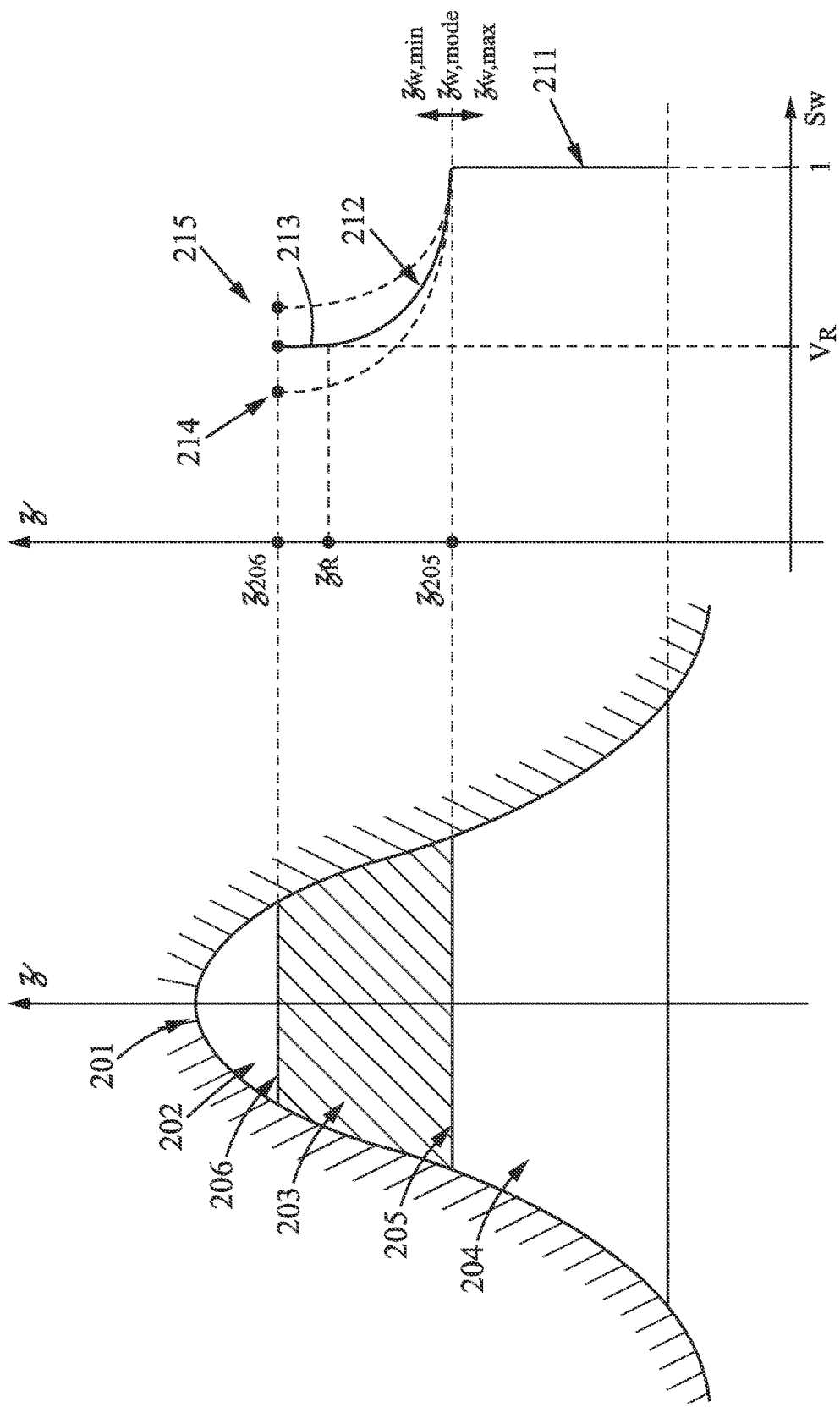
FIG. 2a describes an example of a transversal cross-section of a reservoir comprising water, gas and oil as well as the rate of water saturation of the rock of this reservoir.

In the reservoirs (porous and permeable rocks), the fluids are subjected to gravity and apportioned according to their density. As such, under a permeable rock 201, it is possible to find (see FIG. 2a) gas at the top (zone 202), oil/petrol in the middle (zone 203) and finally water (zone 204).

Underneath the oil/water contact 205 (dimension $z_{205}$), the pores are filled only with water and, above the contact 205 (zone 203), they can be filled with oil but residual water can also be absorbed in the grains of the rock.

As such, below the dimension $z_{205}$, the water saturation Sw is 1 (curve 211). Above the dimension $z_{205}$, the water saturation Sw decreases progressively (curve 212) to a dimension ($z_R$) at which the water saturation Sw remains substantially constant (i.e. the residual value of water saturation) and equal to $V_R$ (curve 213).

The saturation curves (211, 212, 213) can be, themselves, uncertain (for a fixed dimension $z_{205}$ and known for certain). It is as such possible to determine three water saturation curves:

a curve having a minimum water saturation (214),
a curve having a maximum water saturation (215),
a mode curve having the most likely case (212 and 213).

As such, for each height above the contact 205, it is possible to define a triangular probability distribution for the water saturation using three corresponding points of the curves defined as such.

Moreover, the dimension $z_w$ of the interface between the oil and the water ($z_{205}$ in the example of FIG. 2a) may not be known for certain. This dimension $z_w$ can also be represented by a random variable that follows a law of triangular probability of maximum value $z_{w,min}$, of minimum value $z_{w,max}$ and of mode value $Z_{w,mode}$.

$S_{HC}(Z) = CS_{HC}(z - z_w)$ is noted for revealing the fact that the curve of hydrocarbon saturation can be translated vertically due to the uncertainty on $z_w$:

the curve having a minimum of hydrocarbon saturation is noted as $CS_{HC,min}(z - zw$, the curve having a maximum of hydrocarbon saturation is noted as $CS_{HC,max}(z - zw$, the mode curve having the most likely case is noted as $CS_{HC,mode}(z - z_w)$.

Likewise, the dimension $z_g$ representing the dimension of the gas/oil interface ($z_{206}$ in the example of FIG. 2a for the interface 206) cannot be known for certain. This dimension $z_g$ can be represented by a random variable that follows a law of triangular probability of maximum value $z_{g,min}$, of minimum value $z_{g,max}$ and of mode value $z_{g,mode}$ As such, the expectation of the hydrocarbon saturation $S_{HC}$ can be expressed in the form:

$$Esp(S_{HC}(z)) = Esp(1 - Sw(z))$$
$$= Esp(CS_{HC}(z - z_w))$$
$$= Esp(Esp(CS_{HC}(z - z_w) \mid z_w), z_w)$$

As the variables $CS_{HC}$ and Zw can be considered, geologically, as two independent random variables, it is possible to write:

$$Esp(S_{HC}(z)) =$$
$$\int_{z_{w,max}}^{z_{w,min}} \int_{cs_{HC,min}}^{cs_{HC,max}} cs_{HC}(z - z_w) \cdot p(CS_{HC}(z - z_w) \mid z_w) \cdot p(z_w) \cdot dcs_{HC} \cdot dz_w$$

$$Esp(S_{HC}(z)) = \int_{z_{w,max}}^{z_{w,min}} p(z_w) \cdot Esp(CS_{HC}(z - z_w) \text{ knowing } z_w) \cdot dz_w$$

$$Esp(S_{HC}(z)) =$$
$$\int_{z_{w,max}}^{z_{w,min}} \frac{cs_{HC,min}(z - z_w) + cs_{HC,mode}(z - z_w) + cs_{HC,max}(z - z_w)}{3} p(z_w) \cdot dz_w$$

As such, there are three terms to be calculated of the type $$\int_{z_{w,max}}^{z_{w,min}} \frac{cs_{HC,XXX}(z-z_w)}{3} p(z_w) \cdot dz_w$$

(with XXX among min, max and mode).

If the probability distribution of $z_w$ is assumed to be triangular, it is possible to establish two cases:

if $z_w \in [z_{w,max}, z_{w,mode}]$ $$p(z_w) = p_{1p} \cdot z_w + p_{1c} = \frac{2 \cdot z_w}{(z_{w,min} - z_{w,max}) \cdot (z_{w,mode} - z_{w,max})} + \frac{-2 z_{w,max}}{(z_{w,min} - z_{w,max}) \cdot (z_{w,mode} - z_{w,max})}$$

if $z_w \in [z_{w,mode}, z_{w,min}]$ $$p(z_w) = p_{2p} \cdot z_w + p_{2c} = \frac{-2 \cdot z_w}{(z_{w,min} - z_{w,max}) \cdot (z_{w,min} - z_{w,mode})} + \frac{2 \cdot z_{w,min}}{(z_{w,min} - z_{w,max}) \cdot (z_{w,min} - z_{w,mode})}$$

As such:

$$\int_{z_{w,max}}^{z_{w,min}} \frac{cs_{HC,XXX}(z-z_w)}{3} p(z_w) \cdot dz_w =$$

$$\int_{z_{w,max}}^{z_{w,mode}} \left[ \frac{cs_{HC,XXX}(z-z_w)}{3}(p_{1p} \cdot z_w + p_{1c}) \right] \cdot dz_w +$$

$$\int_{z_{w,mode}}^{z_{w,min}} \left[ \frac{cs_{HC,XXX}(z-z_w)}{3}(p_{2p} \cdot z_w + p_{2c}) \right] \cdot dz_w$$

Then by carrying out a change in the variable $h=z-z_w$, it is possible to write:

$$\int_{z_{w,max}}^{z_{w,min}} \frac{cs_{HC,XXX}(z-z_w)}{3} p(z_w) \cdot dz_w =$$

$$\int_{z-z_{w,mode}}^{z-z_{w,max}} \left[ \frac{cs_{HC,XXX}(h)}{3}(p_{1p}(z-h) + p_{1c}) \right] \cdot dh +$$

$$\int_{z-z_{w,min}}^{z-z_{w,mode}} \left[ \frac{cs_{HC,XXX}(h)}{3}(p_{2p}(z-h) + p_{2c}) \right] \cdot dh$$

In practice, the curve $cs_{HC,XXX}$ (and therefore the curve $Sw_{YYY}$ with YYY=min if XXX=max, YYY=mode if XXX=mode and YYY=max if XXX=min, as $Sw_{min}=1-CS_{HC,max}$) is often linear by pieces, for example, between two successive dimensions of the following lists:

$h1_1, h1_2, \ldots h1_{n-1}, h1_{n1}$ (ordinates in increasing order in the interval $[z-z_{w,max}, z-z_{w,mode}]$, with the end dimensions corresponding to the boundaries of the interval, with these end dimensions able to not correspond to a breakpoint of the linearity of the curve, see hereinbelow) and $h2_1, h2_2, \ldots h2_{n2-1}, h2_{n2}$ (ordinates in increasing order in the interval $[z-z_{w,mode}, z-z_{w,min}]$, with the end dimensions corresponding to the boundaries of the interval, as such $h2_1=h1_{n1}$, with these end dimensions able to not correspond to a breakpoint of the linearity of the curve, see hereinbelow).

Figure 2B:
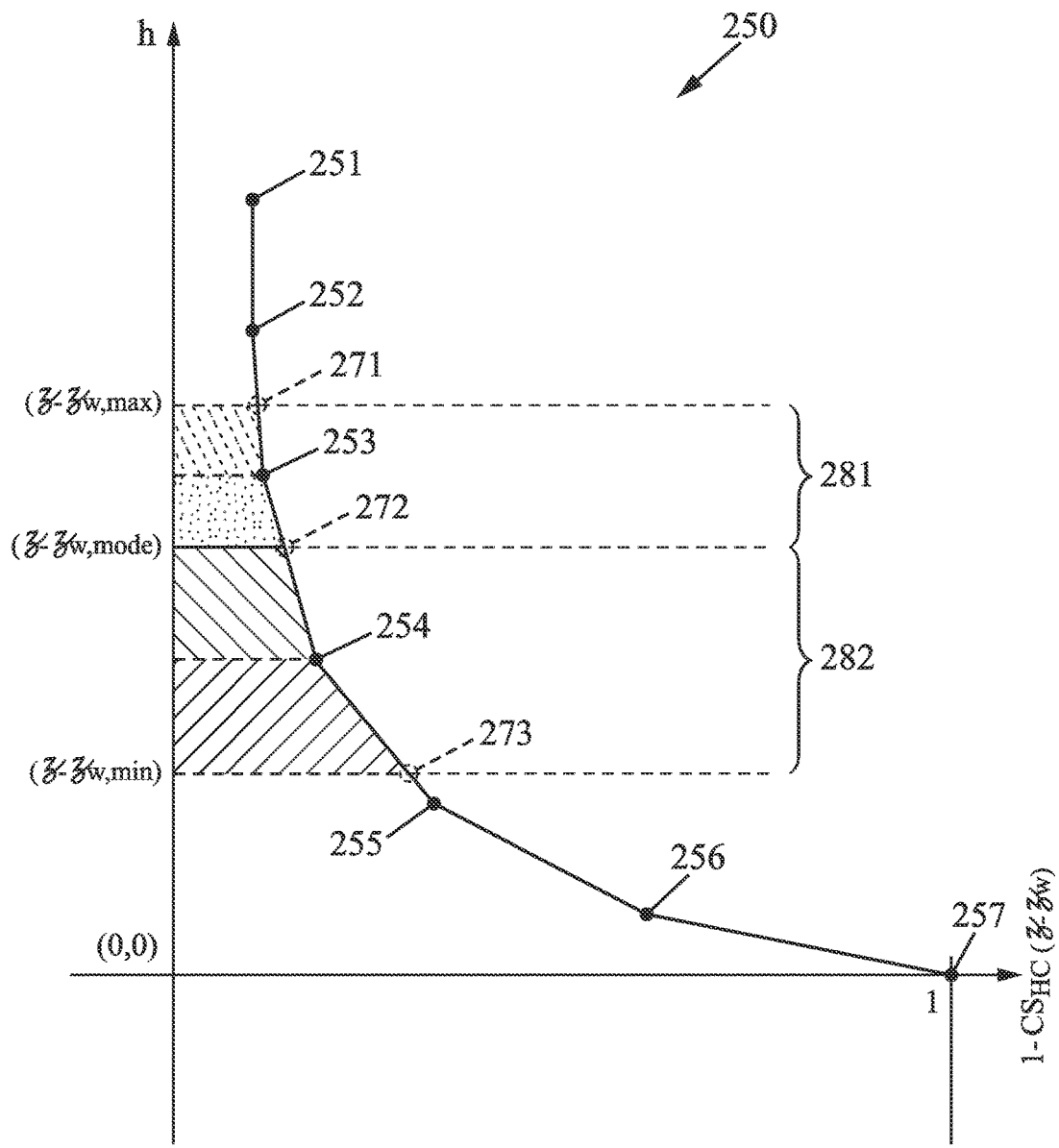
FIG. 2b describes an example of a water saturation curve of the rock of a reservoir modelled as being continuous and linear in pieces.

For example, FIG. 2b shows an example of a water saturation curve $1-CS_{HC,XXX}(z-z_w)$ (250), with the dimension $z_w$ represented by the line $h=0$.

This curve 250 is linear by piece between the successive points 251, 252, 253, 254, 255, 256 and 257.

If the point of dimension (z does not correspond to one of the preceding points, it is possible to define a new point 271 on the linear portion of the water saturation curve between the points 252 and 253. The same applies for the dimension $(z-z_{w,mode})$ (corresponding then to the new point 272) and for the dimension $(z-z_{w,min})$ (corresponding then to the new point 273).

As such:

$$\int_{z-z_{w,min}}^{z-z_{w,max}} \frac{cs_{HC,XXX}(z-z_w)}{3} p(z_w) \cdot dz_w =$$

$$\sum_{i=1}^{n1-1} \left[ \int_{h1_{i+1}}^{h1_i} \left[ \frac{cs_{HC,XXX}(h)}{3}(p_{1p}(z-h) + p_{1c}) \right] \cdot dh \right] +$$

$$\sum_{i=1}^{n2-1} \left[ \int_{h2_{i+1}}^{h2_i} \left[ \frac{cs_{HC,XXX}(h)}{3}(p_{2p}(z-h) + p_{2c}) \right] \cdot dh \right]$$

In the example of FIG. 2b, each one of the two preceding sums comprises two terms:

$$-\sum_{i=1}^{n1-1} \left[ \int_{h1_{i+1}}^{h1_i} \left[ \frac{cs_{HC,XXX}(h)}{3}(p_{1p}(z-h) + p_{1c}) \right] \cdot dh \right]$$

(interval 281) comprises a terms corresponding to the integral between the dimensions of the point 271 and of the point 253 and an integral term between the dimensions of the point 253 and of the point 272;

$$-\sum_{i=1}^{n2-1} \left[ \int_{h2_{i+1}}^{h2_i} \left[ \frac{cs_{HC,XXX}(h)}{3}(p_{2p}(z-h) + p_{2c}) \right] \cdot dh \right]$$

(interval 282) comprises a term corresponding to the integral between the dimensions of the point 272 and of the point 254 and an integral term between the dimensions of the point 254 and of the point 273.

It is considered that the equation describing the curve $cs_{HC,XXX}$ between two points $h1_i$ and $h1_{i+1}$ is $A1_{i,XXX}h+B1_{i,XXX}$ and that the equation describing the curve $cs_{HC,XXX}$ between two points $h2_i$ and $h2_{i+1}$ is $A2_{i,XXX}h+B2_{i,XXXX}$.

In other words, the curve $cs_{HC,XXX}$ is linear by piece between two following successive points: $(C1_{1,XXX}, h1_1)$, $(C1_{2,XXX}, h1_2), \ldots (C1_{n1-1,XXX}, h1_{n1-1}), (C1_{n1,XXX}, h1_{n1})=(C2_{1,XXX}, h2_1), (C2_{2,XXX}, h2_2), \ldots (C2_{n2-1,XXX}, h2_{n2-1}), (C2_{n2,XXX}, h2_{n2})$.

Then:

$$\frac{C1_{i+1,XXX} - C1_{i,XXX}}{h1_{i+1} - h1_i} = A1_{i,XXX} \text{ and}$$

$$C1_{i,XXX} - \frac{C1_{i+1,XXX} - C1_{i,XXX}}{h1_{i+1} - h1_i} h1_i = B1_{i,XXX} \text{ and}$$

$$\frac{C2_{i+1,XXX} - C2_{i,XXX}}{h2_{i+1} - h2_i} = A2_{i,XXX} \text{ and}$$

$$C2_{i,XXX} - \frac{C2_{i+1,XXX} - C2_{i,XXX}}{h2_{i+1} - h2_i} h2_i = B2_{i,XXX}$$

and

As such:

$$\int_{z_{w,max}}^{z_{w,min}} \frac{cs_{HC,XXX}(z - z_w)}{3} p(z_w) \cdot dz_w =$$

$$\sum_{i=1}^{n1-1} \left[ \int_{h1_i}^{h1_{i+1}} \left[ \frac{A1_{i,XXX} \cdot h + B1_{i,XXX}}{3} (p_{1p}(z-h) + p_{1c}) \right] \cdot dh \right] +$$

$$\sum_{i=1}^{n2-1} \left[ \int_{h2_i}^{h2_{i+1}} \left[ \frac{A2_{i,XXX} \cdot h + B2_{i,XXX}}{3} (p_{2p}(z-h) + p_{2c}) \right] \cdot dh \right]$$

or:

$$\int_{z_{w,max}}^{z_{w,min}} \frac{cs_{HC,XXX}(z - z_w)}{3} p(z_w) \cdot dz_w =$$

$$\frac{1}{3} \sum_{i=1}^{n1-1} \left[ \left( -p_{1p} \cdot A1_{i,XXX} \cdot \frac{h1_{i+1}^3}{3} + \right.\right.$$

$$(A1_{i,XXX} \cdot (p_{1c} + p_{1p}) \cdot z) - p_{1p} \cdot B1_{i,XXX} \right) \cdot$$

$$\frac{h1_{i+1}^2}{2} + B1_{i,XXX} \cdot (p_{1c} + p_{1p}z) \cdot h1_{i+1} \right) -$$

$$\left( -p_{1p} \cdot A1_{i,XXX} \cdot \frac{h1_i^3}{3} + (A1_{i,XXX} \cdot (p_{1c} + p_{1p} \cdot z) - \right.$$

$$p_{1p} \cdot z) - p_{1p} \cdot B1_{i,XXX} \right) \cdot$$

$$\left.\left. \frac{h1_i^2}{2} + B1_{i,XXX} \cdot (p_{1c} + p_{1p}z) \cdot h1_i \right) \right] +$$

$$\frac{1}{3} \sum_{i=1}^{n2-1} \left[ \left( -p_{2p} \cdot A2_{i,XXX} \cdot \frac{h2_{i+1}^3}{3} + A2_{i,XXX} \cdot (p_{2c} + p_{2p}) \cdot z \right) - \right.$$

$$p_{2p} \cdot B2_{i,XXX} \right) \cdot \frac{h2_{i+1}^2}{2} +$$

$$B2_{i,XXX} \cdot (p_{2c} + p_{2p}z) \cdot h2_{i+1} \right) -$$

$$\left( -p_{2p} \cdot A2_{i,XXX} \cdot \frac{h2_i^3}{3} + \right.$$

$$A2_{i,XXX} \cdot (p_{2c} + p_{2p} \cdot z) -$$

$$p_{2p} \cdot B2_{i,XXX} \right) \cdot$$

$$\left.\left. \frac{h2_i^2}{2} + B2_{i,XXX} \cdot (p_{2c} + p_{2p}z) \cdot h2_i \right) \right]$$

As such, each one of the terms of $Esp(S_{HC}(z))$ can be calculated easily $$\left(\text{i.e.} \int_{z_{w,max}}^{z_{w,min}} \frac{cs_{HC,XXX}(z - z_w)}{3} p(z_w) \cdot dz_w \right.$$

with XXX among min, max and mode).

Moreover, it is possible to define the "oil+water" signalling (or the "liquid-gas" signalling, with the liquid here being the oil and the water) $1_{OW}$ by:

$$1_{OW}(z) = \begin{cases} 1 \text{ if } z < z_g \\ 0 \text{ otherwise} \end{cases}$$

As such, the oil saturation can be expressed in the form:

$$So(z) = S_{HC}(z) \cdot 1_{OW}(z)$$

In conclusion:

$$Esp(So(z)) = Esp(S_{HC}(z)) \cdot Esp(1_{OW}(z))$$

The "liquid-gas" signalling can be determined as follows:

$$Esp(1_{OW}(z)) = \begin{cases} 0 \text{ if } z \geq z_{g,min} \\ 1 - \int_{z_{G,min}}^{z} p(z_g) dz_g \text{ if } z_{g,max} \leq z \leq z_{g,min} \\ 1 \text{ if } z \leq z_{g,max} \end{cases}$$

with $p(z_g)$ the probability that the dimension of the gas-oil interface $z_g$ is located at this dimension, and with this probability having a distribution between the boundaries $z_{g,max}$ and $z_{g,min}$.

Figure 3:
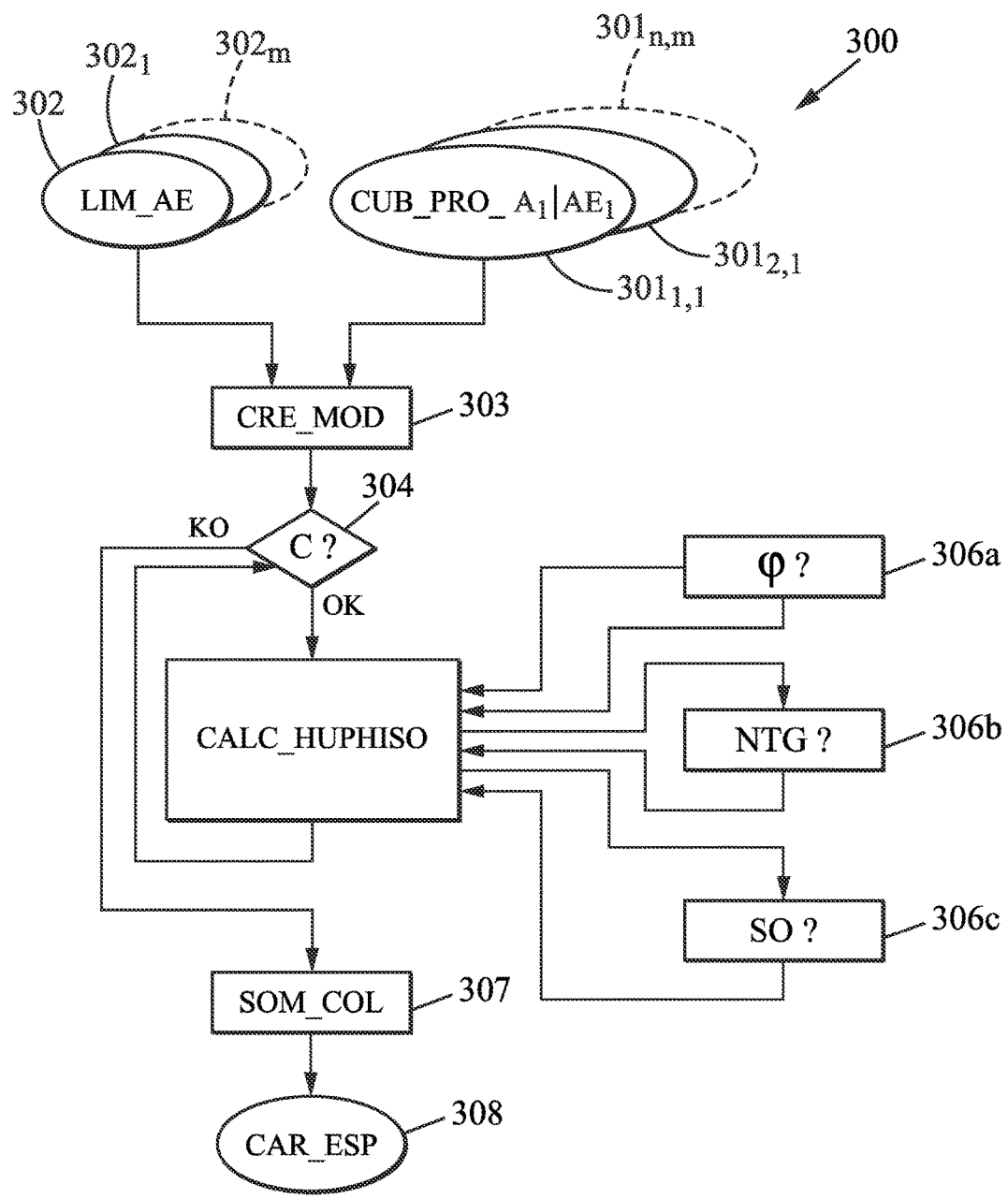
FIG. 3 is an example of a flow chart of an embodiment of the invention.

FIG. 3 shows a flow chart that allows for the determining of an expectation of the HuPhiSo map, in an embodiment of the invention.

During the receiving of the receiving of the $n \times m$ proportion cubes $301_{1,1}, 301_{2,1}, \ldots, 301_{n,m}$ (respectively describing the proportions of the facies $A_1|AE_1, A_2|AE_1, \ldots A_n|AE_m$) and of the apportionment cubes of the m architectural elements $302_1, 302_2, \ldots, 302_m$ (respectively describing the architectural element $AE_1, AE_2, \ldots AE_m$ in the model), it is possible to create (step 303) an empty HuPhiSo model. This model is a model that comprises cells/pixels. This model is of dimensions similar to the dimensions of the proportion cubes and/or of the apportionment cubes describing the apportionment of the architectural elements.

The proportion cube $301_{i,j}$ comprises a plurality of cells c each associated with three proportion values as such describing a triangular distribution of proportion: a minimum value $p_{min,A_i|AE_j}(c)$, a maximum value $p_{max,A_i|AE_j}(c)$ and a mode value $p_{mode,A_i|AE_j}(c)$.

The apportionment cube $302_j$ comprises a plurality of cells c with each one associated with a proportion value $p_{AE_j}(c)$.

If a cell of the model does not have any associated value of expectation of HuPhiSo (test 304, output OK), this cell is selected.

It is as such possible to determine (step 305) the expectation of the HuPhiSo value for the selected cell:

$$\sum_{A_i} h_c \cdot$$

-continued $$\left(\sum_{AE_j}\left(p_{AE_j}(c)\cdot\frac{p_{min,A_i|AE_j}(c)+p_{mode,A_i|AE_j}(c)+p_{max,A_i|AE_j}(c)}{3}\right)\right)\cdot$$

$$(Esp(\varphi_{c,A_i})\cdot Esp(NTG_{c,A_i})\cdot Esp(SO_{c,A_i}))$$

This formula creates a certain number of simplifications based on geological considerations mentioned hereinabove.

If it is considered that the variables $\varphi_{c,A_i}$, $NTG_{c,A_i}$, or $SO_{c,A_i}$ are certain (i.e. fixed values without uncertainty) for the cells c and for the facies Ai, then the expectation of these values is equal to these certain values and the value determined in the step 305 can be directly associated with the cell selected in the model.

If ever the variable $\varphi_{c,A_i}$ is considered to be uncertain, three values that represent a triangular probability distribution are provided for this cell selected and for each facies $A_i$: a minimum value $\varphi_{c,A_i,min}$, a maximum value $\varphi_{c,A_i,max}$, and a mode value $\varphi_{c,A_i,mode}$. Then, the expectation of the porosity for the selected cell and for the facies $A_i$ is (step 306a):

$$Esp(\varphi_{c,A_i})=\frac{\varphi_{c,A_i,min}+\varphi_{c,A_i,mode}+\varphi_{c,A_i,max}}{3}$$

Likewise, if the variable $NTG_{c,A_i}$ is considered to be uncertain, three values representing a triangular distribution of probability are provided for this selected cell and for each facies A: a minimum value $NTG_{c,A_i,min}$, a maximum value $NTG_{c,A_i,max}$, and a mode value $NTG_{c,A_i,mode}$. Then, the expectation of the value NTG for the selected cell and for the facies $A_i$ is (step 306b):

$$Esp(NTG_{c,A_i})=\frac{NTG_{c,A_i,min}+NTG_{c,A_i,mode}+NTG_{c,A_i,max}}{3}$$

Finally, if the variable $SO_{c,A_i}$ is considered to be uncertain, three water saturation curves are provided as a function of the depth z of the mesh c, a minimum, maximum and mode curve, linear by piece and respectively defined by a plurality of points and by three values representing a triangular distribution of probability for the value of the dimension of a water-oil interface: a minimum value $z_{w,max}$, a maximum value $z_{w,min}$, and a mode value $Z_{w,mode}$. Then, the expectation of the value SO for the selected cell is (step 306c) calculated as indicated hereinabove.

A probability distribution $p(z_g)$ of the oil-gas dimension $z_g$ can also be provided.

The value determined in the step 305 and in the step 306a and/or 306b and/or 306c can be used to calculate a value of the expectation of the variable HuPhiSo. This expectation can then be associated with this cell.

If all of the cells of the model have an associated value of expectation of HuPhiSo (test 304, output KO), it is possible to add (step 307) the expectations of HuPhiSo of the cells that belong to the same column in order to obtain an expectation of HuPhiSo column for said column under consideration.

This map 308 is then provided to an operator for viewing and/or later processing.

Determination of the Variance

Moreover, the variance of the HuPhiSo column values can be expressed in the form:

$$Var(HuPhiSo_{column})=Esp(HuPhiSo_{column}^2)-Esp(HuPhiSo_{column})^2$$

The calculation of the term $Esp(HuPhiSo_{column})$ and therefore of $Esp(HuPhiSo_{column})_2$ is detailed hereinabove and the latter can be calculated for the calculation of the variance.

The formula hereinbelow makes the hypothesis that, geologically, the variables $\varphi_{c,A_i}$, $NTG_{c,A_i}$ and $SO_{c,A_i}$ are independent variables:

$$Esp(HuPhiSo^2)=$$

$$\sum_A\sum_{B=A}\sum_{c1}\sum_{c2=c1}h_{c1}h_{c2}\cdot Esp(1_A(c1)1_B(c2))\cdot Esp(\varphi_{c1,A}\varphi_{c2,B})\cdot$$

$$Esp(NTG_{c1,A}NTG_{c2,B})\cdot Esp(So_{c1,A}So_{c2,B})+$$

$$\sum_A\sum_{B\neq A}\sum_{c1}\sum_{c2=c1}h_{c1}h_{c2}\cdot Esp(1_A(c1)1_B(c2))\cdot Esp(\varphi_{c1,A}\varphi_{c2,B})\cdot$$

$$Esp(NTG_{c1,A}NTG_{c2,B})\cdot Esp(So_{c1,A}So_{c2,B})+$$

$$\sum_A\sum_{B=A}\sum_{c1}\sum_{c2\neq c1}h_{c1}h_{c2}\cdot Esp(1_A(c1)1_B(c2))\cdot Esp(\varphi_{c1,A}\varphi_{c2,B})\cdot$$

$$Esp(NTG_{c1,A}NTG_{c2,B})\cdot Esp(So_{c1,A}So_{c2,B})+$$

$$\sum_A\sum_{B\neq A}\sum_{c1}\sum_{c2\neq c1}h_{c1}h_{c2}\cdot Esp(1_A(c1)1_B(c2))\cdot Esp(\varphi_{c1,A}\varphi_{c2,B})\cdot$$

$$Esp(NTG_{c1,A}NTG_{c2,B})\cdot Esp(So_{c1,A}So_{c2,B})$$

with A, B a facies (possibly identical) among the various facies possible, and c1, c2 a cell (possible identical) of the column under consideration for the calculation of the column HuPhiSO.

The first quadruple sum corresponds to the terms where the facies A and B are identical and the cells c1 and c2 are identical, the second sum corresponds to the terms where the facies A and B are different but the cells c1 and c2 identical, the third sum corresponds to the cases where the facies A and B are the same but the cells c1 and c2 different and finally the last sum corresponds to the cases where the facies A and B are different and the cells c1 and c2 also.

The geological hypothesis is made that there cannot be two different facies in the same cell, i.e.:

$$Esp(1_A(c1)\cdot 1_B(c2))=0 \text{ if } c1=c2 \text{ and } A\neq B$$

As such:

$$Esp(HuPhiSo^2)=$$

$$\sum_c\sum_A h_c^2\cdot Esp(1_A(c)^2)\cdot Esp(\varphi_{c,A}^2)\cdot Esp(NTG_{c,A}^2)\cdot Esp(So_{c,A}^2)+$$

$$\sum_A\sum_{c1}\sum_{c2\neq c1}h_{c1}h_{c2}\cdot Esp(1_A(c1)1_A(c2))\cdot Esp(\varphi_{c1,A}\varphi_{c2,A})\cdot$$

$$Esp(NTG_{c1,A}NTG_{c2,A})\cdot Esp(So_{c1,A}So_{c2,A})+$$

$$\sum_A\sum_{B\neq A}\sum_{c1}\sum_{c2\neq c1}h_{c1}h_{c2}\cdot Esp(1_A(c1)1_B(c2))\cdot Esp(\varphi_{c1,A}\varphi_{c2,B})\cdot$$

$$Esp(NTG_{c1,A}NTG_{c2,B})\cdot Esp(So_{c1,A}So_{c2,B})$$

This sum reveals a certain number of identical terms that it is possible to group together in order to decrease the required calculation time.

If the column under consideration comprises n cells and if there are N facies possible (the latter then being indexed), it is possible to write:

$$Esp(HuPhiSo^2) = \sum_c \sum_A \left[ h_c^2 \cdot Esp(\varphi_{c,A}^2) \cdot Esp(NTG_{c,A}^2) \cdot \right.$$

$$\left. Esp(So_{c,A}^2) \cdot \sum_{AE} Esp(p_{AE}(c)) \cdot Esp(p_{A,AE}(c)) \right] +$$

$$2 \sum_{A=1}^{N} \sum_{c1=1}^{n-1} \sum_{c2=c1+1}^{n} \left[ h_{c1} h_{c2} Esp(1_A(c1)1_A(c2)) \cdot \right.$$

$$Esp(\varphi_{c1,A}\varphi_{c2,A}) \cdot Esp(NTG_{c1,A}NTG_{c2,A}) \cdot$$

$$Esp(So_{c1,A}So_{c2,A}) \cdot \sum_{AE1}\sum_{AE2} Esp(1_{AE1}(c1)1_{AE2}(c2)) \cdot$$

$$\left. Esp(1_{A,AE1}(c1)1_{A,AE2}(c2)) \right] +$$

$$2 \sum_{c1=1}^{n-1} \sum_{c2=c1+1}^{n} \sum_{A=1}^{N} \sum_{B \neq A}^{N} \left[ h_{c1} h_{c2} Esp(1_A(c1)1_B(c2)) \cdot Esp(\varphi_{c1,A}\varphi_{c2,B}) \cdot \right.$$

$$Esp(NTG_{c1,A}NTG_{c2,B}) \cdot Esp(So_{c1,A}So_{c2,B}) \cdot$$

$$\sum_{AE1}\sum_{AE2} Esp(1_{AE1}(c1)1_{AE2}(c2)) \cdot$$

$$\left. Esp(1_{A,AE1}(c1)1_{B,AE2}(c2)) \right]$$

The term $\Sigma_{AE} Esp(p_{AE}(c)) \cdot Esp(p_{A,AE}(c))$ was calculated previously and, following the geological simplifications made, is:

$$\sum_{AE} \frac{p_{AE}(c) \cdot (p_{A,AE\text{-}min}(c) + p_{A,AE\text{-}mode}(c) + p_{A,AE\text{-}max}(c))}{3}$$

The term $Esp(1_{AE1}(c1)1_{AE2}(c2))$ can be expressed as follows if the geological hypothesis is made according to which the uncertainties concerning the architectural elements are only horizontal (there are no vertical uncertainties):

$$Esp(1_{AE1}(c1) \cdot 1_{AE2}(c2)) =$$
$$\begin{cases} p_{AE1}(c1) \cdot p_{AE2}(c2) \text{ if at least one of the } AE \text{ is certain} \\ p_{AE}(c1) \text{ if the } AE \text{ are all uncertain and } AE1 = AE2 \\ 0 \text{ if the } AE \text{ are all uncertain and } AE1 \neq AE2 \end{cases}$$

That is to say:

$$Esp(1_{AE1}(c1) \cdot 1_{AE2}(c2)) = \begin{cases} p_{AE2}(c2) \text{ if } (p_{AE1}(c1) = 1) \\ p_{AE1}(c1) \text{ if } (p_{AE2}(c1) = 1) \\ 0 \text{ if } (p_{AE1}(c1) = 0) \text{ or if } (p_{AE2}(c2) = 0) \\ \text{otherwise } \begin{cases} p_{AE}(c1) \text{ if } AE1 = AE2 \\ 0 \text{ if } AE1 \neq AE2 \end{cases} \end{cases}$$

Then, we have:

$$\sum_{AE1}\sum_{AE2} Esp(1_{AE1}(c1) \cdot 1_{AE2}(c2)) \cdot Esp(1_{A,AE1}(c1) \cdot 1_{B,AE2}(c2)) =$$

$$\sum_{AE1} Esp(1_{AE1}(c1) \cdot 1_{AE1}(c2)) \cdot Esp(1_{A,AE1}(c1) \cdot 1_{B,AE1}(c2)) +$$

$$\sum_{AE1} \sum_{AE2 \neq AE1} Esp(1_{AE1}(c1) \cdot 1_{AE2}(c2)) \cdot Esp(1_{A,AE1}(c1) \cdot 1_{B,AE2}(c2))$$

It is assumed that, geologically, the signalling of facies of two cells located in different architectural elements are independent between them. As such, for $AE1 \neq AE2$:

$$Esp(1_{A,AE1}(c1) \cdot 1_{B,AE2}(c2)) =$$
$$Esp(1_{A,AE1}(c1)) \cdot Esp(1_{B,AE2}(c2)) = Esp(p_{A,AE1}(c1)) \cdot Esp(p_{B,AE2}(c2))$$

Moreover, after certain geological considerations, for $AE1=AE2$, it is possible to write, if the facies are identical (i.e. A=B):

$$Esp(1_{A,AE}(c1) \cdot 1_{A,AE}(c2)) = (1 - \rho(A, \Delta z)) \cdot$$
$$\left( Esp(p_{A,AE,c1}) \cdot Esp(p_{A,AE,c2}) + \sqrt{\text{Var}(p_{A,AE,c1}) \cdot \text{Var}(p_{A,AE,c2})} \right) +$$
$$\rho(A, \Delta z) \cdot \left( \frac{1}{2} Esp(p_{A,AE,c1}) + \frac{1}{2} Esp(p_{A,AE,c2}) \right)$$

with $\rho(A, \Delta z)$ the "correlogram" function of the facies A (also noted as $\rho_A(\Delta z)$ or $\rho_A(c1,c2)$ and defined hereinafter) and $\Delta z$ the difference of vertical dimensions according to the vertical axis z (i.e. the axis of the column) between the cells $c_1$ and $c_2$.

In addition, for different facies (i.e. $A \neq B$), it is possible to write:

$$Esp(1_{A,AE}(c1) \cdot 1_{B,AE}(c2)) =$$
$$\left( Esp(p_{A,AE}) \cdot Esp(p_{B,AE}) \mp \sqrt{\text{Var}(p_{A,AE}(c1)) \cdot \text{Var}(p_{B,AE}(c2))} \right) \cdot$$
$$(1 - \rho(A, \Delta z))$$

The term variogram is used to refer to a random variable X, the function $\gamma$:

$$\gamma(X, h) = \frac{1}{2} \cdot Esp((X(u + h) - X(u))^2)$$

This variogram $\gamma$ represents the spatial structuring of the covariance between the variable X at a point of the space and the same variable X at another point.

Most often, the variograms $\gamma$ of a real-valued random variable respect the following conditions:
  The variogram $\gamma$ is an increasing function of the distance, which means that the more two points are separated then more the data at these points is correlated.
  Beyond a distance $R_\gamma$ (also called "range"), the variogram $\gamma$ has reached its asymptotic value (or almost, i.e. 95% of this value), which means that the spatial structuring of the data exists only up to this characteristic distance $R_\gamma$; beyond this distance $R_\gamma$, the data is no longer correlated.

For a zero distance, the variogram $\gamma$ is zero, which means that the correlation between the data is perfect for two points that are very close to one another.

The correlogram $\rho$ is called a standardised covariance:

$$\rho(X, h) = \frac{Cov(X(u+h), X(u))}{Cov(X(u), X(u))} = 1 - \frac{\gamma(X, h)}{Cov(X(u), X(u))}$$

Most often, for a given real-valued random variable X (such as the facies), the correlogram can be modelled in the form (with $R_\gamma$ being a predetermined value):
of an exponential correlogram:

$$\rho(h) = \exp\left(-\frac{3h}{R_\gamma}\right)$$

of a spherical correlogram:

$$\rho(h) = \begin{cases} 1 - \frac{3}{2} \cdot \frac{h}{R_\gamma} + \frac{1}{2} \cdot \left(\frac{h}{R_\gamma}\right)^3 & \text{if } h < R_\gamma \\ 0 & \text{otherwise} \end{cases}$$

of a Gaussian correlogram:

$$\rho(h) = \begin{cases} \exp\left(-\left(\frac{3h}{R_\gamma}\right)^2\right) & \text{if } h < R_\gamma \\ 0 & \text{otherwise} \end{cases}$$

As mentioned hereinabove, geologically, the cells of the same facies can be apportioned by blocs, which are often the result of the history of the sedimentary environment to which they belong.

For example, for a sedimentary environment of the channel type in the marine environment (sand, turbidities), the flows of sand can have provokes the formation of sand lobes. These lobes will be modelled by the geologist as a group of cells of sand facies.

This trend that the cells of the same facies have to group themselves into groups, of the same shape and of the same average size, defines a spatial correlation of the facies. A cell that is close to another cell as such has more chance to be part of the same facies as the latter. It is possible to model this spatial correlation with the variograms or a correlogram:

$Cov(1_A(c1), 1_A(c2)) = \rho_A(c1,c2) \cdot Var(1_A(c1)) \cdot Var(1_A(c2))$

The values $R_\gamma$ or "ranges" (see hereinabove) of facies (in the three dimensions of space) are the dimensions of the geological forms observed in the field, in a given architectural element. A variogram or a correlogram of the facies can then be defined by architectural element.

If the signalling of facies is correlated spatially via the variograms, the proportions of facies can be perfectly correlated between them.

For the calculation of the HuPhiSo, the variograms can be input data. Variograms are used in particular for spatially correlating the variables NTG and Phi.

Geologically, the spatial correlations can apply only to the stochastic portion (noted as $X_{stoch}$) of the random variables (X), with the uncertainties on the average then being perfectly correlated between them.

In addition, the correlations between the porosities or the variables NTG for two different cells are carried out in the same facies. As such, there is a correlation between two porosities or variables NTG, in two different cells, only for the same facies. For two different facies, the stochastic portions of the variables NTG and Phi can be independent.

It is then possible to calculate the covariances between the stochastic variables for two different cells and the same facies:

$Cov(NTG_{stoch}(c1), NTG_{stoch}(c2))$ $= \rho_{NTG}(c1,c2) \cdot Var(NTG_{stoch}(c1)) \cdot Var(NTG_{stoch}(c2))$ $Cov(\varphi_{stoch}(c1), \varphi_{stoch}(c2)) = \rho_\varphi(c1,c2) \cdot Var(\varphi_{stoch}(c1)) \cdot Var(\varphi_{stoch}(c2))$ or $\rho_{NTG}$ is the vertical correlogram of the variable NTG and $\rho_\varphi$ the vertical correlogram of the variable Phi.

With regards to the term $Esp(\varphi_{c,A}^2)$, it is possible to write, after certain geological considerations, that $Esp(\varphi_{c,A}^2) = Esp(\varphi_{c,A})^2 + Var(\varphi_{c,A,avg}) + Var(\varphi_{c,A,stoch})$.

The same applies for the variable NTG and as such $ESp(NTG_{c,A}^2) = ESp(NTG_{c,A})^2 + Var(NTG_{c,A,moy}) + Var(NTG_{c,A,stoch})$.

With regards to the expectation of the product of the porosity for the same facies and two different cells, it is possible to write, after certain geological considerations (in particular by assuming that there is a perfect correlation between the uncertainties over the average portion of the correlogram of the variable Phi):

$Esp(\varphi_{c1,A} \cdot \varphi_{c2,A})$ $= Esp(\varphi_{c1,A}) \cdot Esp(\varphi_{c2,A}) + \sqrt{Var(\varphi_{c1,A,inc}) \cdot Var(\varphi_{c2,A,inc})}$ $+ \rho_{\varphi_{stoch}} \sqrt{Var(\varphi_{c1,A,stoch}) \cdot Var(\varphi_{c2,A,stoch})}$ or $\rho_{\varphi_{stoch}}$ is the stochastic portion of the correlogram of the variable Phi (see hereinabove) and $\varphi_{c1,A,inc}$ is the uncertainty on the average (i.e. if the distribution of $\varphi_{c1,A}$ is triangular with minimum boundary a, maximum boundary c and mode b, $$\varphi_{c1,A,inc} = \frac{a^2 + b^2 + c^2 - ab - bc - ca}{18}\right).$$

The same applies for the variable NTG and as such:

$Esp(NTG_{c1,A} \cdot NTG_{c2,A})$ $= Esp(NTG_{c1,A}) \cdot Esp(NTG_{c2,A}) + \sqrt{Var(NTG_{c1,A,inc}) \cdot Var(NTG_{c2,A,inc})}$ $+ \rho_{NTG_{stoch}} \sqrt{Var(NTG_{c1,A,stoch}) \cdot Var(NTG_{c2,A,stoch})}$ where $\rho_{NTG_{stoch}}$ is the stochastic portion of the correlogram of the variable NTG (see hereinabove).

Likewise, if $A \neq B$, it is then possible to write:

$Esp(\varphi_{c1,A} \cdot \varphi_{c2,B}) =$ $Esp(\varphi_{c1,A}) \cdot Esp(\varphi_{c2,B}) + \sqrt{Var(\varphi_{c1,A,inc}) \cdot Var(\varphi_{c2,B,inc})}$ $Esp(NTG_{c1,A} \cdot NTG_{c2,B}) =$ $Esp(NTG_{c1,A}) \cdot Esp(NTG_{c2,B}) + \sqrt{Var(NTG_{c1,A,inc}) \cdot Var(NTG_{c2,B,inc})}$ As such, by re-using the notations hereinabove:

$$Esp(S_{HC}(z)^2) = \frac{1}{6}(Esp(S_{HC,min}(z)^2) + Esp(S_{HC,mode}(z)^2) +$$

$$Esp(S_{HC,max}(z)^2) + Esp(S_{HC,min}(z) \cdot S_{HC,mode}(z)) +$$

$$Esp(S_{HC,min}(z) \cdot S_{HC,max}(z)) + Esp(S_{HC,mode}(z) \cdot S_{HC,max}(z)))$$

As an illustration, the value $Esp(S_{HC,XX1}(z) \cdot S_{HC,XX2}(z))$ can be calculated (with XX1 and XX2 among mode, min and max and with XX1 and XX2 different) as follows:

$$Esp(S_{HC,XX1}(z) \cdot S_{HC,XX2}(z)) = \sum_{i=1}^{n1-1} \left\{ \left[ -p_{1p} \cdot A1_{i,XX1} \cdot A1_{i,XX2} \cdot \frac{h1_{i+1}^4}{4} + \right. \right.$$

$$\{A1_{i,XX1} \cdot A1_{i,XX2} \cdot (p_{1p} \cdot z + p_{1c}) -$$

$$p_{1p} \cdot (A1_{i,XX1} B1_{i,XX2} + A1_{i,XX2} B1_{i,XX1})\} \cdot \frac{h1_{i+1}^3}{3} +$$

$$\{(A1_{i,XX1} B1_{i,XX2} + A1_{i,XX2} B1_{i,XX1}) \cdot (p_{1p} \cdot z + p_{1c})\} \cdot \frac{h1_{i+1}^2}{2} -$$

$$\left. p_{1c} \cdot B1_{i,XX1} \cdot B1_{i,XX2} \cdot h1_{i+1} \right] -$$

$$\left[ -p_{1p} \cdot A1_{i,XX1} \cdot A1_{i,XX2} \cdot \frac{h1_i^4}{4} + \{A1_{i,XX1} \cdot A1_{i,XX2} \cdot (p_{1p} \cdot z + p_{1c}) - \right.$$

$$p_{1p} \cdot (A1_{i,XX1} B1_{i,XX2} + A1_{i,XX2} B1_{i,XX1})\} \cdot \frac{h1_i^3}{3} +$$

$$\{(A1_{i,XX1} B1_{i,XX2} + A1_{i,XX2} B1_{i,XX1}) \cdot (p_{1p} \cdot z + p_{1c})\} \cdot \frac{h1_i^2}{2} -$$

$$\left. \left. p_{1c} \cdot B1_{i,XX1} \cdot B1_{i,XX2} \cdot h1_i \right] \right\} +$$

$$\sum_{i=1}^{n2-1} \left\{ \left[ -p_{2p} \cdot A2_{i,XX1} \cdot A2_{i,XX2} \cdot \frac{h2_{i+1}^4}{4} + \right. \right.$$

$$\{A2_{i,XX1} \cdot A2_{i,XX2} \cdot (p_{2p} \cdot z + p_{2c}) -$$

$$p_{2p} \cdot (A2_{i,XX1} B2_{i,XX2} + A2_{i,XX2} B2_{i,XX1})\} \cdot \frac{h2_{i+1}^3}{3} +$$

$$\{(A2_{i,XX1} B2_{i,XX2} + A2_{i,XX2} B2_{i,XX1}) \cdot (p_{2p} \cdot z + p_{2c})\} \cdot \frac{h2_{i+1}^2}{2} -$$

$$\left. p_{2c} \cdot B2_{i,XX1} \cdot B2_{i,XX2} \cdot h2_{i+1} \right] - \left[ -p_{2p} \cdot A2_{i,XX1} \cdot \right.$$

$$A2_{i,XX2} \cdot \frac{h2_i^4}{4} + \{A2_{i,XX1} \cdot A2_{i,XX2} \cdot (p_{2p} \cdot z + p_{2c}) - p_{2p} \cdot$$

$$(A2_{i,XX1} B2_{i,XX2} + A2_{i,XX2} B2_{i,XX1})\} \cdot \frac{h2_i^3}{3} +$$

$$\{(A2_{i,XX1} B2_{i,XX2} + A2_{i,XX2} B2_{i,XX1}) \cdot (p_{2p} \cdot z + p_{2c})\} \cdot$$

$$\left. \left. \frac{h2_i^2}{2} - p_{2c} \cdot B2_{i,XX1} \cdot B2_{i,XX2} \cdot h2_i \right] \right\}$$

Moreover, with $z_1$ different from $z_2$:

$$Esp(S_{HC,A}(z_1) \cdot S_{HC,B}(z_2)) =$$

$$\frac{1}{6}(E(S_{HC,A,min}(z_1) \cdot S_{HC,B,min}(z_2)) + E(S_{HC,A,mode}(z_1) \cdot S_{HC,B,mode}(z_2)) +$$

$$E(S_{HC,A,max}(z_1) \cdot S_{HC,B,max}(z_2))) +$$

$$\frac{1}{12}(E(S_{HC,A,min}(z_1) \cdot S_{HC,B,mode}(z_2)) + E(S_{HC,A,mode}(z_1) \cdot S_{HC,B,min}(z_2)) +$$

$$E(S_{HC,A,min}(z_1) \cdot S_{HC,B,max}(z_2)) + E(S_{HC,A,max}(z_1) \cdot S_{HC,B,min}(z_2)) +$$

$$E(S_{HC,A,mode}(z_1) \cdot S_{HC,B,max}(z_2)) + E(S_{HC,A,max}(z_1) \cdot S_{HC,B,mode}(z_2)))$$

Each one of the terms of this formula can be calculated as follows (with XX1 and XX2 among mode, min and max):

$$E(S_{HC,A,XX1}(z_1) \cdot S_{HC,B,XX2}(z_2)) =$$

$$\sum_{i=1}^{n1} \int_{z_{w,i}}^{z_{w,i+1}} (p_{1p} \cdot z_w + p_{1c}) \cdot (A1_{i,XX1} \cdot (z_1 - z_w) + B1_{i,XX1}) \cdot$$

$$(A2_{i,XX2} \cdot (z_2 - z_w) + B2_{i,XX2}) \cdot dz_w +$$

$$\sum_{i=2}^{n2} \int_{z_{w,i}}^{z_{w,i+1}} (p_{2p} \cdot z_w + p_{2c}) \cdot (A1_{i,XX1} \cdot (z_1 - z_w) + B1_{i,XX1}) \cdot$$

$$(A2_{i,XX2} \cdot (z_2 - z_w) + B2_{i,XX2}) \cdot dz_w$$

In addition:

$$Esp(So_{c,A}) = Esp(S_{HC,A}(c)) \cdot Esp(1_{OW}(c))$$

$$Esp(So_{c,A}^2) = Esp(S_{HC,A}(c)^2) \cdot Esp(1_{OW}(c))$$

and $$Esp(So_{c1,A} \cdot So_{c2,B}) = Esp(S_{HC,A}(c1) \cdot S_{HC,B}(c2)) \cdot Esp(1_{OW}(c1) \cdot 1_{OW}(c2))$$

knowing that:

$$Esp(1_{OW}(z_1) \cdot 1_{OW}(z_2)) = Esp(1_{OW}(\text{Max}(z_1, z_2)))$$

Furthermore, there may be certain uncertainties as to the position of the structures in the reservoir, which as such can modify the "HuPhiSo" maps (of variance or of expectation).

These uncertainties can be linked
to the errors and to the inaccuracy of the measurements, for example concerning the position and the orientation of surfaces. This uncertainty primarily concerns the geometry of the structures;
to the natural variability of the geological objects, which is more or less substantial according to the geological objects (e.g. the natural variability of a fault surface is much lower than that of a mineralisation surface of a uranium deposit);
to the lack of knowledge, on the existence of a structure for example.

It is possible to account for these uncertainties by integrating them into the uncertainty on the position of the oil-water interface mentioned hereinabove.

By using the preceding notations, it is possible to consider that the uncertainty of the oil-water interface follows a triangular distribution (uncertainty mentioned hereinabove) but to which is added an uncertainty of the normal distribution of deviation $\sigma(z)$ (linked to the uncertainty of the structure).

Under geological hypotheses, the term:

$$\int_{z_{w,max}}^{z_{w,min}} \frac{c_{SHC,XXX}(z - z_w)}{3} p(z_w) \cdot dz_w$$

(mentioned hereinabove) can be replaced with, a change in the variable $h = z - z_w$ having been carried out:

$$\int_{z-3\sigma(z)}^{z+3\sigma(z)} \int_{z-z_{w,mode}}^{z-z_{w,max}} (p_{1p} \cdot (z'-h) + p_{1c}) \cdot \frac{cs_{HC,XXX}(h)}{3} \cdot dh \cdot \left(\frac{e^{-\frac{1}{2}\left(\frac{z'}{\sigma(z)}\right)^2}}{2\pi\sigma(z)}\right)$$

$$dz' + \int_{z-3\sigma(z)}^{z+3\sigma(z)} \int_{z-z_{w,min}}^{z-z_{w,mode}} (p_{2p} \cdot (z'-h) + p_{2c}) \cdot$$

$$\frac{cs_{HC,XXX}(h)}{3} \cdot dh \cdot \left(\frac{e^{-\frac{1}{2}\left(\frac{z'}{\sigma(z)}\right)^2}}{2\pi\sigma(z)}\right) dz'$$

As such, by using the preceding notations, it is possible to replace:

$$\int_{z_{w,max}}^{z_{w,min}} \frac{cs_{HC,XXX}(z-z_w)}{3} p(z_w) \cdot dz_w$$

with:

$$\int_{z-3\sigma(z)}^{z+3\sigma(z)} \left\{ \frac{1}{3} \sum_{i=1}^{n1-1} \left[ \left( -p_{1p} \cdot A1_{i,XXX} \cdot \frac{h1_{i+1}^3}{3} + \right. \right. \right.$$

$$(A1_{i,XXX} \cdot (p_{1c} + p_{1p} \cdot z') - p_{1p} \cdot B1_{i,XXX}) \cdot \frac{h1_{i+1}^2}{2} +$$

$$\left. B1_{i,XXX} \cdot (p_{1c} + p_{1p}z') \cdot h1_{i+1} \right) - \left( -p_{1p} \cdot A1_{i,XXX} \cdot \frac{h1_i^3}{3} + \right.$$

$$(A1_{i,XXX} \cdot (p_{1c} + p_{1p} \cdot z') - p_{1p} \cdot B1_{i,XXX}) \cdot \frac{h1_i^2}{2} +$$

$$\left. \left. B1_{i,XXX} \cdot (p_{1c} + p_{1p}z') \cdot h1_i \right) \right] +$$

$$\frac{1}{3} \sum_{i=1}^{n2-1} \left[ \left( -p_{2p} \cdot A2_{i,XXX} \cdot \frac{h2_{i+1}^3}{3} + \right. \right.$$

$$(A2_{i,XXX} \cdot (p_{2c} + p_{2p} \cdot z') - p_{2p} \cdot B2_{i,XXX}) \cdot \frac{h2_{i+1}^2}{2} +$$

$$\left. B2_{i,XXX} \cdot (p_{2c} + p_{2p}z') \cdot h2_{i+1} \right) - \left( -p_{2p} \cdot A2_{i,XXX} \cdot \frac{h2_i^3}{3} + \right.$$

$$(A2_{i,XXX} \cdot (p_{2c} + p_{2p} \cdot z') - p_{2p} \cdot B2_{i,XXX}) \cdot \frac{h2_i^2}{2} +$$

$$\left. \left. \left. B2_{i,XXX} \cdot (p_{2c} + p_{2p}z') \cdot h2_i \right) \right] \right\} \left\{ \frac{e^{-\frac{1}{2}\left(\frac{z'}{\sigma(z)}\right)^2}}{2\pi\sigma(z)} \right\} dz'$$

Moreover, it is possible to calculate the variance of the value HuPhiSo taking account of the uncertainties on the structure (or $Var(HuPhiSo_{str\_inc})$), using the value of the variance of this value HuPhiSo without uncertainty (or $Var(HuPhiSo)$ calculated hereinabove):

$$Var(HuPhiSo_{str\_inc}) = Var(HuPhiSo) + \left[\frac{Esp(HuPhiSo_{str\_inc})}{Esp(H_{str\_inc})}\right]^2 Var(H_{str\_inc})$$

with $H_{str\_inc}$ the height of the column above the water-oil interface.

Figure 4:
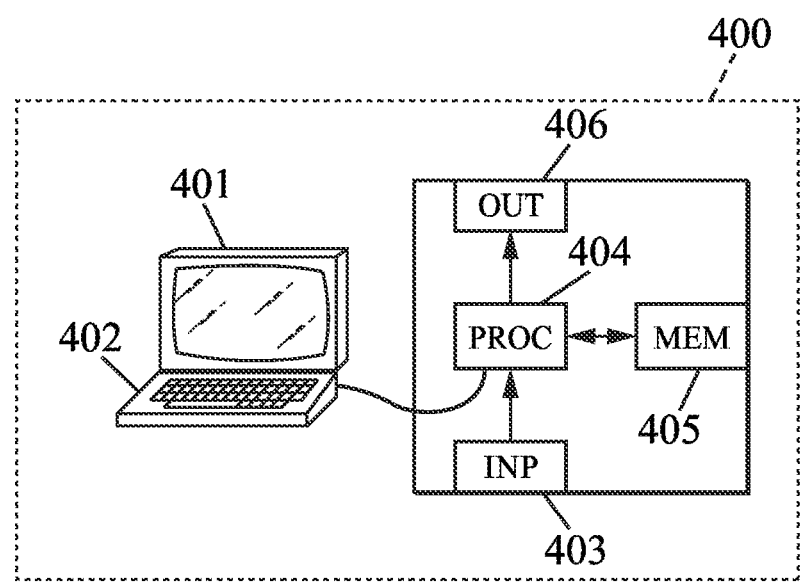
FIG. 4 shows an example of a device allowing for the implementation of an embodiment of the invention.

FIG. 4 shows an example of a device for determining a map of expectation of height of liquid hydrocarbon in an embodiment of the invention.

In this embodiment, the device comprises a computer 400, comprising a memory 405 for storing instructions allowing for the implementation of the method, the data of the measurements received, and temporary data for carrying out the various steps of the method such as described hereinabove.

The computer further comprises a circuit 404. This circuit can be, for example:
  a processor able to interpret instructions in the form of a computer program, or
  an electronic card of which the steps of the method of the invention are described in the silicon, or
  a programmable electronic chip such as a FPGA chip ("Field-Programmable Gate Array").

This computer comprises an input interface 403 for the receiving of data in particular the proportion cubes required for the calculations of the invention, and an output interface 406 for the supplying of maps of expectation of the height of liquid hydrocarbon. Finally, the computer can comprise, in order to allow for an easy interaction with a user, a screen 401 and a keyboard 402. Of course, the keyboard is optional, in particular in the framework of a computer having the form of a touch tablet, for example.

Moreover, the block diagram shown in FIG. 3 is a typical example of a program of which certain instructions can be carried out with the equipment described. As such, FIG. 3 can correspond to the flow chart of the general algorithm of a computer program in terms of the invention.

Figure 5C:
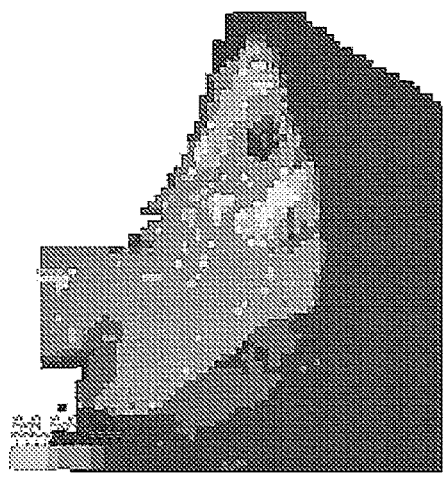
FIGS. 5c and 5d are respectively examples of maps of expectation and of variance of height of liquid hydrocarbon in the model determined using methods according to a possible embodiment of the invention.
Figure 5D:
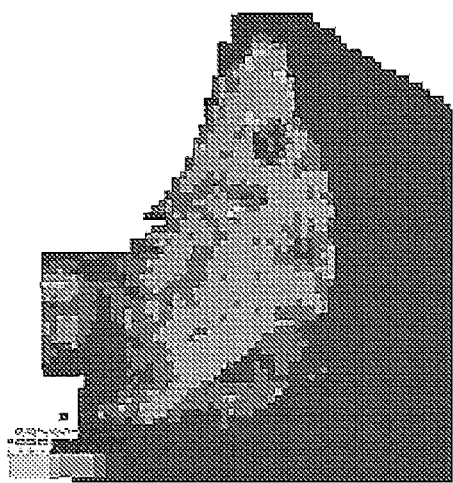
Figure 5A:
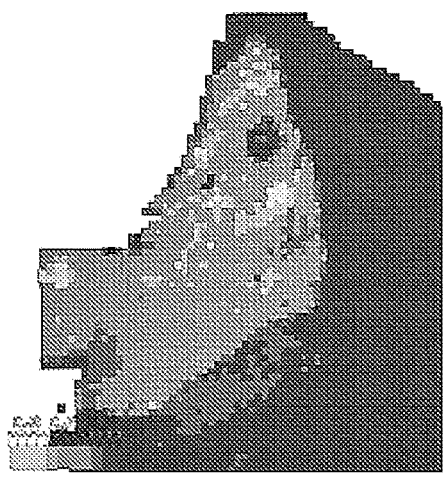
FIGS. 5a and 5b are respectively examples of maps of expectation and of variance of height of liquid hydrocarbon in the model determined using multi-creation tools.

FIG. 5a is an example of a map of the expectation of the variable HuPhiSo for a meshed model calculated using methods of prior art known (i.e. calculation using a plurality of creations or "multi-creations", with the expectation of these creations then being calculated).

Figure 5B:
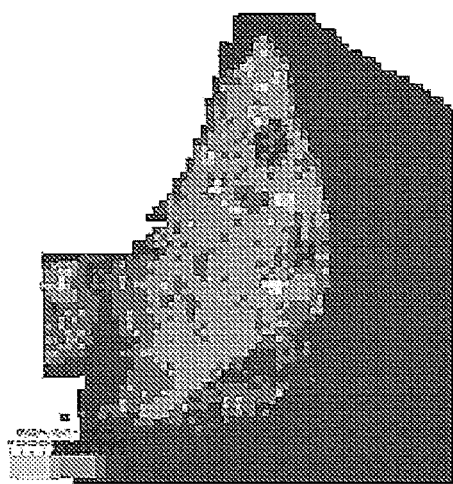

FIG. 5b is an example of a map of the variance of the variable HuPhiSo for a meshed model calculated using methods of prior art known (multi-creations).

The meshed model, considered in these examples, comprises 80,000 meshes. The uncertainty concerning in particular the proportion cubes, the porosity, the water saturations are taken into account. The calculation of a hundred creations takes about 20 h. However, it is usual to determine rather 2000 creations during such a calculation as "multi-creation" in order to ensure a correct convergence of the results. As such, the calculation time can largely exceed 20 h.

For this same model and the same taking into account of uncertainties, the FIG. 5c is an example of a map of the expectation of the variable HuPhiSo determined using a method that implements one of the embodiments of the invention. FIG. 5d is an example of a map of the variance of the variable HuPhiSo determined using a method that implements one of the embodiments of the invention.

The calculation of the maps 5c and 5d using one of the embodiments of the invention takes about 2 h for a result that is entirely comparable with the maps 5a and 5b (respectively 2% difference on the average and 0.5% differences on the average).

Of course, this invention is not limited to the forms of creation described hereinabove by way of examples; it extends to other alternatives.

Other embodiments are possible.

The invention claimed is:

1. A method for determining a map of expectation of height of liquid hydrocarbon in a geological model, the geological model comprising meshes that can be associated with a facies among a plurality of facies and with an architectural element among a plurality of architectural elements, the method comprises, for at least one column of the geological model:

(a) receiving an apportionment cube for each architectural element AE among the plurality of architectural elements, with the apportionment cube describing for each mesh c of the model the probability $p_{AE}(c)$ that said mesh belongs to said architectural element, (b) receiving a proportion cube for each facies among the plurality of facies and for each architectural element among the plurality of architectural elements, with the proportion cube associated with a facies A and with an architectural element AE describing for each mesh c of the model the proportion of said facies in said mesh if said mesh belongs to said architectural element AE, with said proportion being a random variable of triangular distribution defined by a minimum value $p_{A,AE,min}(c)$, a maximum value $p_{A,AE,max}(c)$, and a mode $p_{A,AE,mode}(c)$, (c) determining, for each mesh c of said column and for each facies A of the plurality of facies, the sum over the plurality of architectural elements of, and $$P_{AE}(c) \cdot \tfrac{1}{3}(P_{A,AE,min}(c) + P_{A,AE,max}(c) + \text{and } P_{A,AE,mode}(c)),$$

(d) determining a value of expectation of height of liquid hydrocarbon for said column analytically according to the sum determined in the step (c) for each mesh c of said column and for each facies A.

2. The method according to claim 1, wherein, with each mesh c of the model being associated with a proportion of porosity for each one of the facies of said plurality of facies, with said proportion of porosity being a random variable of triangular distribution defined by a minimum value $\varphi_{A,min}(c)$, a maximum value $\varphi_{A,max}(C)$, and a mode $\varphi_{A,mode}(c)$, the method further comprises:

(c-1) determining, for each mesh c of said column and for each facies A among the plurality of facies, the value
$\tfrac{1}{3}(\varphi_{A,min}(c) + \varphi_{A,max}(c) + \varphi_{A,mode}(c))$ wherein, the determination of the step (d) is a function of the value determined in the step (c-1) for each mesh c of said column and for each facies A among the plurality of facies.

3. The method according claim 1, wherein, with each mesh c of the model being associated with a proportion of rock volume favourable to the presence of hydrocarbons for each one of the facies of said plurality of facies, with said proportion of rock volume favourable to the presence of hydrocarbons being a random variable of triangular distribution defined by a minimum value $NTG_{A,min}(c)$, a maximum value $NTG_{A,max}(c)$, and a mode $NTG_{A,mode}(c)$, the method further comprises:

(c-2) determining, for each mesh c of said column and for each facies A among the plurality of facies, the value
$\tfrac{1}{3}(NTG_{A,min}(c) + NTG_{A,max}(c) + NTG_{A,mode}(c))$, wherein, the determination of the step /d/ is a function of the value determined in the step (c-2) for each mesh c of said column and for each facies A among the plurality of facies.

4. The method according to claim 1, wherein, with each mesh c of the model being associated with a liquid hydrocarbon saturation, said liquid hydrocarbon saturation being characterised by a liquid hydrocarbon-water interface dimension $z_w$ having a distribution probability $p(z_w)$ between a maximum value $z_{w,min}$, and a minimum value $z_{w,max}$, and by a triangular distribution of the hydrocarbon saturation for each dimension h above this interface dimension, said distribution of hydrocarbon saturation being defined by a minimum value $CS_{HC,A,min}(h)$, a maximum value $CS_{HC,A,mode}(h)$, and a mode $CS_{HC,A,mode}(h)$, the method further comprises:

(c-3) determining, for each mesh c of said column having a dimension z and for each facies A among the plurality of facies, the value $$\int_{z_{w,max}}^{z_{w,min}} \frac{cs_{HC,min}(z-z_w) + cs_{HC,mode}(z-z_w) + cs_{HC,max}(z-z_w)}{3} p(z_w) \cdot dz_w$$

wherein, the determination of the step /d/ is a function of the value determined in the step (c-3) for each mesh c of said column and for each facies A among the plurality of facies.

5. The method according to claim 4, wherein, with said liquid hydrocarbon saturation being characterised by a liquid hydrocarbon-gas interface dimension $z_g$ having a probability $p(z_g)$, of distribution between a maximum value $z_{g,min}$, and a minimum value $z_{g,max}$, the method further comprises:

(c-4) determining, for each mesh c of said column having a dimension z, the value $$\begin{cases} 0 & \text{if } z \geq z_{g,min} \\ 1 - \int_{z_{g,max}}^{z} p(z_g) dz_g & \text{if } z_{g,max} \leq z \leq z_{g,min} \\ 1 & \text{if } z \leq z_{g,max} \end{cases}$$

wherein, the determination of the step /d/ is a function of the value determined in the step (c-3) for each mesh c of dimension z of said column and for each facies A among the plurality of facies, multiplied by the value determined in the step (c-4) for each mesh c of dimension z of said column.

6. The method for determining a map of variance of height of liquid hydrocarbon in a geological model, the method comprises, for at least one column of the geological model:

(e) determining a value of expectation of height of liquid hydrocarbon for said column, according to claim 1;

(f) in determining a value of variance of height of liquid hydrocarbon for said column analytically according to the sum determined in the step (e).

7. The method according to claim 6, wherein, the values of the proportion cubes for two different cells of the model and for different architectural elements are considered independently between them.

8. The method according to claim 6, wherein, the method further comprises:

(g) receiving a correlogram $\rho(A, \Delta z)$ according to a direction of said column for said facies A in a given architectural element;

(h) determining the expectation of the product of the presence of the facies A in said architectural element in a mesh c1 by the presence of the facies A in said architectural element in a mesh c2, with the distance between c1 and c2 according to said direction of the correlogram being $\Delta z$, with the probability of the presence of the facies A of said architectural element for the mesh c1 being $p_{A,AE,c1}$, with the probability of the presence of the facies A of said architectural element for the mesh c2 being $p_{A,AE,c2}$, according to:

$(1 - \rho(A, \Delta z)) \cdot (Esp(p_{A,AE,c1}) \cdot Esp(p_{A,AE,c2}) + \sqrt{Var(p_{A,AE,c1}) \cdot Var(p_{A,AE,c2})} + \rho(A, \Delta z) \cdot (\tfrac{1}{2} Esp(p_{A,AE,c1}) + \tfrac{1}{2} Esp(p_{A,AE,c2}))$ wherein, the determination of the step (f) is according to the determination of the step /h/.

9. A device for determining a map of expectation of height of liquid hydrocarbon in a geological model, with the geological model comprising meshes able to be associated with a facies among a plurality of facies and with an architectural element among a plurality of architectural elements, the device comprises, for at least one column of the geological model:
(a) an interface for receiving an apportionment cube of architectural element for each architectural element AE among the plurality of architectural elements, with the apportionment cube describing for each mesh c of the model the probability $p_{AE}(c)$ that said mesh belongs to said architectural element,
(b) an interface for the receiving a proportion cube for each facies among the plurality of facies and for each architectural element among the plurality of architectural elements, with the proportion cube associated with a facies A and with an architectural element AE describing for each mesh c of the model the proportion of said facies in said mesh if said mesh belongs to said architectural element AE, with said proportion being a random variable of triangular distribution defined by a minimum value $p_{A,AE,min}(c)$, a maximum value $p_{A,AE,max}(c)$, and a mode $p_{A,AE\ mode}(c)$,
(c) a circuit for the determining, for each mesh c of said column and for each facies A of the plurality of facies, the sum over the plurality of architectural elements of $p_{AE}(c) \cdot \frac{1}{3} (p_{A,AE,min}(c) + p_{A,AE,max}(c) + p_{A,AE,mode}(c))$,
(d) a circuit for the determining of a value of expectation of height of liquid hydrocarbon for said column analytically according to the sum determined by the circuit (c) for each mesh c of said column and for each facies A.

10. A computer program product comprising instructions for the implementing of the method according to claim 1, when this program is executed by a processor.

* * * * *